(12) United States Patent
Shin et al.

(10) Patent No.: US 11,980,897 B2
(45) Date of Patent: May 14, 2024

(54) ELECTRIFICATION APPARATUS FOR ELECTRIC DUST COLLECTION

(71) Applicant: LG Electronics Inc., Seoul (KR)

(72) Inventors: Namgyu Shin, Seoul (KR); Dong Hyuk Lee, Seoul (KR); Naehyun Park, Seoul (KR); Ah Ram Kim, Seoul (KR); Giseop Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 357 days.

(21) Appl. No.: 17/313,518

(22) Filed: May 6, 2021

(65) Prior Publication Data

US 2022/0032320 A1 Feb. 3, 2022

(30) Foreign Application Priority Data

Jul. 30, 2020 (KR) .................. 10-2020-0095187
Jul. 30, 2020 (KR) .................. 10-2020-0095189
(Continued)

(51) Int. Cl.
*B03C 3/47* (2006.01)
*B03C 3/41* (2006.01)
*B60H 3/00* (2006.01)

(52) U.S. Cl.
CPC ............ *B03C 3/47* (2013.01); *B03C 3/41* (2013.01); *B03C 2201/30* (2013.01); *B60H 3/0078* (2013.01)

(58) Field of Classification Search
CPC .... B03C 3/41; B03C 3/40; B03C 3/86; B03C 3/60; B03C 3/47; B03C 3/45; B03C 3/82;
(Continued)

(56) References Cited

U.S. PATENT DOCUMENTS 6,126,727 A * 10/2000 Lo ................... H01T 23/00
96/97
7,601,204 B2 * 10/2009 Woodruff ............... B03C 3/017
96/81
(Continued)

FOREIGN PATENT DOCUMENTS

CN 2281843 Y * 5/1998
CN 203536732 U 4/2014
(Continued)

OTHER PUBLICATIONS

Notice of Allowance in Korean Appln. No. 10-2021-0014208, dated Jun. 21, 2022, 4 pages (with English translation).
(Continued)

*Primary Examiner* — Christopher P Jones
*Assistant Examiner* — Sonji Turner
(74) *Attorney, Agent, or Firm* — Fish & Richardson P.C.

(57) ABSTRACT

An electrification apparatus for dust collection includes an electrification module configured to generate an ion emitted to air and comprising: at least one discharge tip configured to emit the ion in a direction opposite to a flow direction of the air, at least one tip holder supporting the discharge tip, a conductive plate generating a potential difference with the discharge tip, and a frame defining an appearance of the electrification module and supporting the tip holder and the conductive plate. The frame comprises an upper frame disposed at an upper side of the conductive plate and a lower frame disposed at a lower side of the conductive plate, the tip holder is disposed between the upper frame and the lower frame, and an upper surface of the tip holder is coupled to the upper frame and a lower surface of the tip holder is coupled to the lower frame.

19 Claims, 17 Drawing Sheets

(30) Foreign Application Priority Data

Oct. 12, 2020 (KR) .......................... 10-2020-0131337
Feb. 1, 2021 (KR) .......................... 10-2021-0014208

(58) Field of Classification Search
CPC ......... B03C 3/04; B03C 3/38; B03C 2201/30; B03C 2201/10; B03C 2201/06

See application file for complete search history.

(56) References Cited

U.S. PATENT DOCUMENTS

| | | | | |
|---|---|---|---|---|
| 8,889,079 | B2 * | 11/2014 | Zahedi | C01B 13/0288 |
| | | | | 422/171 |
| 10,414,247 | B2 * | 9/2019 | Jee | B60H 3/0078 |
| 2018/0051895 | A1 | 2/2018 | Morioka | |

FOREIGN PATENT DOCUMENTS

| | | | | |
|---|---|---|---|---|
| CN | 107755096 | A | 3/2018 | |
| CN | 110732411 | A | 1/2020 | |
| JP | 2001276649 | A | 10/2001 | |
| JP | 2006 305447 | A | 11/2006 | |
| JP | 2014039659 | | 3/2014 | |
| KR | 19910013682 | | 7/1991 | |
| KR | 20030065681 | | 8/2003 | |
| KR | 20200009889 | | 1/2020 | |
| KR | 20200009889 | A * | 1/2020 | .............. B03C 3/41 |
| KR | 20200081672 | | 7/2020 | |

OTHER PUBLICATIONS

Office Action in Chinese Appln. No. 202110360837.7, dated May 9, 2023, 20 pages (with English translation).

* cited by examiner

ELECTRIFICATION APPARATUS FOR ELECTRIC DUST COLLECTION

CROSS-REFERENCE TO RELATED APPLICATION

This application claims priority to and the benefit of Korean Patent Application No. 10-2020-0095189, filed on Jul. 30, 2020, No. 10-2020-0095187, filed on Jul. 30, 2020, No. 10-2020-0131337, filed on Oct. 12, 2020, and No. 10-2021-0014208, filed on Feb. 1, 2021, the disclosures of which are incorporated herein by reference in its entirety.

BACKGROUND

1. Field of the Disclosure

The present disclosure relates to an electrification apparatus for electric dust collection, and one particular implementation relates to an electrification apparatus for electric dust collection including a tip holder capable of stably supporting a discharge tip to generate an ion and reinforcing rigidity of a frame.

2. Description of Related Art

A method of removing particles may include two processes of electriciaton and dust collection. The method may electrify the dust and collect the electrified dust in a dust collecting filter.

Examples of dust collection may include physical dust collection using a nonwoven fabric, electric dust collection using a dielectric filter, and a method of applying an electrostatic force to a physical dust collecting filter using an electrostatic nonwoven fabric.

Electrification may include diffusion electrification, electric field electrification, and hybrid electrification (having both of diffuse electrification and electric field electrification).

The electric field electrification applied to the hybrid electrification is advantageous for collecting large particles and the diffusion electrification is advantageous for collecting small particles.

Korean Patent Publication No. 10-2020-0009889 discloses a structure to fix and support a conductive microfiber and a cable on an installation frame disposed at an inside of a main frame.

According to the configuration disclosed in the related art document, the installation frame defines, at one of both surfaces thereof, an installation opening into which the conductive microfiber and the cable may be inserted, and the conductive microfiber and the cable are inserted into the installation opening in a horizontal direction to couple the conductive microfiber and the cable to the installation frame by press-fitting.

For an electrification apparatus for electric dust collection disclosed in the related art document, the installation opening is formed by at least partially opening one side of the installation frame, and the microfiber and the cable are coupled to the installation frame in the horizontal direction by the press-fitting. In this case, the installation frame may be easily broken if an excessive magnitude of force is applied thereto during the coupling. The installation frame has a bar shape with fixed both ends, the conductive microfiber is spaced apart from one of both ends by a predetermined distance, and the coupling force is applied in a direction perpendicular to an extending direction of the installation frame by the press-fitting. For this reason, the installation frame may be easily broken even with a significantly less magnitude of coupling force.

In addition, the electrification apparatus for electric dust collection disclosed in the related art document forms the installation opening by at least partially opening one surface of the installation frame. In this case, rigidity of the installation frame may be remarkably deteriorated. Due to the deteriorated rigidity thereof, the installation frame may be easily broken or damaged based on the less magnitude of external force during the operation of the electrification apparatus, so the conductive microfiber may be separated from a preset position. Accordingly, electrification efficiency and discharge efficiency obtained using the conductive microfiber are remarkably deteriorated.

RELATED ART DOCUMENT

Patent Document (Patent Document 001) Korean Patent Publication No. 10-2020-0009889

SUMMARY OF THE DISCLOSURE

The present disclosure is conceived to resolve the above mentioned problems and provides an electrification apparatus for electric dust collection in which a discharge tip is disposed on a frame using an additional tip holder configured to support the discharge tip and a high voltage cable to prevent easy separation of the discharge tip occurring based on vibration or an external force, thereby improving electrification efficiency and discharge efficiency.

The present disclosure further provides an electrification apparatus for electric dust collection capable of connecting an upper frame to a lower frame using the tip holder and reinforcing rigidity thereof.

Aspects of the present disclosure are not limited to what has been described. Additionally, other aspects which are not mentioned may be understood by the following description and more clearly understood based on the embodiments of the present disclosure. Further, it will be readily understood that the aspects of the present disclosure may be implemented by features defined in claims and a combination thereof.

According to the present disclosure, an electrification apparatus for electric dust collection includes an electrification module to generate an ion emitted to flowing air, and the electrification module includes at least one discharge tip, at least one tip holder, a conductive plate, and a frame, the frame includes an upper frame disposed on the conductive plate and a lower frame disposed under the conductive plate, the tip holder may be disposed between the upper frame and the lower frame, an upper surface of the tip holder is coupled to the upper frame and a lower surface of the tip holder is coupled to the lower frame. That is, the discharge tip may be firmly supported to stably maintain discharge efficiency and effectively reinforce rigidity of the frame.

In addition, the upper surface of the tip holder may be detachably coupled to the upper frame and the lower surface of the tip holder may be detachably coupled to the lower frame.

In addition, the tip holder may include a hexahedral main body having an upper surface coupled to the upper frame and a lower surface coupled to the lower frame, a pair of upper hooks that protrudes upward from the upper surface of the main body and coupled to the upper frame, and a pair of lower hooks that protrudes downward from the lower surface of the main body and coupled to the lower frame.

In addition, the pair of upper hooks includes a front upper hook disposed at a front end of the upper surface of the main body and a rear upper hook disposed at a rear end of the upper surface of the main body, and the discharge tip is disposed between the front upper hook and the rear upper hook and protrudes upward from the upper surface.

In addition, a protruding height of the discharge tip from the upper surface of the main body may be larger than a protruding height of each of the front upper hook and the rear upper hook from the upper surface of the main body.

In addition, the front upper hook and the rear upper hook may be deformed in a direction away from each other when the front upper hook and the rear upper hook are coupled to the upper frame.

In addition, the pair of lower hooks may include a front lower hook disposed at a front end of the lower surface of the main body and a rear lower hook disposed at the rear end of the lower surface of the main body.

In addition, the front lower hook and the rear lower hook are deformed in a direction away from each other when the front upper hook and the rear upper hook are coupled to the lower frame.

In addition, the upper frame may include a pair of first coupling holes through which the front upper hook and the rear upper hook pass and an open hole is defined between the pair of first coupling holes and is configured to pass the discharge tip and at least partially expose the upper surface of the main body to outside.

In addition, the lower frame may include a pair of second coupling holes through which the front lower hook and the rear lower hook pass.

In addition, the electrification module may further include a high voltage cable that extends inward through the main body and is electrically connected to the discharge tip inside the main body.

In addition, the electrification module may further include a tube surrounding a contact point at which the discharge tip and the high voltage cable are electrically connected, and the tube may at least partially protrudes from an upper surface of the tip holder.

In addition, the tube may include a heat shrinkable tube.

In addition, the main body is formed by coupling a first half body and a second half body that are separately manufactured, the discharge tip and the high voltage may be at least partially disposed between the first half body and the second half body and may be pressed by the first half body and the second half body.

In addition, a seating groove may be defined at one surface of the first half body facing the second half body and may have a shape corresponding to an outer shape of the discharge tip and the high voltage cable.

In addition, the main body may be formed by insert-injecting the discharge tip and the high voltage cable.

In addition, the electrification module may further include a high voltage supplier configured to generate a voltage to supply the voltage to the discharge tip, and the high voltage cable may include a single main cable having a first end electrically connected to the high voltage supplier.

In addition, the at least one discharge tip may include a first discharge tip and a second discharge tip that are spaced apart from each other, and the high voltage cable may further include a first cable electrically connected to the first discharge tip and a second cable electrically connected to the second discharge tip, and the first cable and the second cable may each be branched from a second end of the single main cable.

In addition, the electrification module may further include a cable holder to accommodate a branch point at which the single main cable is branched into the first cable and the second cable.

Further, the electrification apparatus for electric dust collection may further include a cover module disposed at a front side of the electrification module and the cover module may include the high voltage supplier.

According to the present disclosure, the electrification apparatus for electric dust collection may firmly support the discharge tip using the tip holder, thereby improving electrification efficiency and discharge efficiency.

In addition, according to the present disclosure, as the electrification apparatus for electric dust collection may reinforce the rigidity of the frame using the tip holder, the electrification apparatus for electric dust collection may maintain the strength of the frame at a predetermined level or more without any additional fastener.

In addition, the electrification apparatus for electric dust collection according to the present disclosure may minimize an installation space of the high voltage cable and minimize manufacturing cost using a cable holder configured to support the high voltage cable.

Hereafter, further effects of the present disclosure, in addition to the above-mentioned effects, are described together while describing specific matters for implementing the present disclosure.

DETAILED DESCRIPTION OF EXEMPLARY IMPLEMENTATIONS

Figure 1:
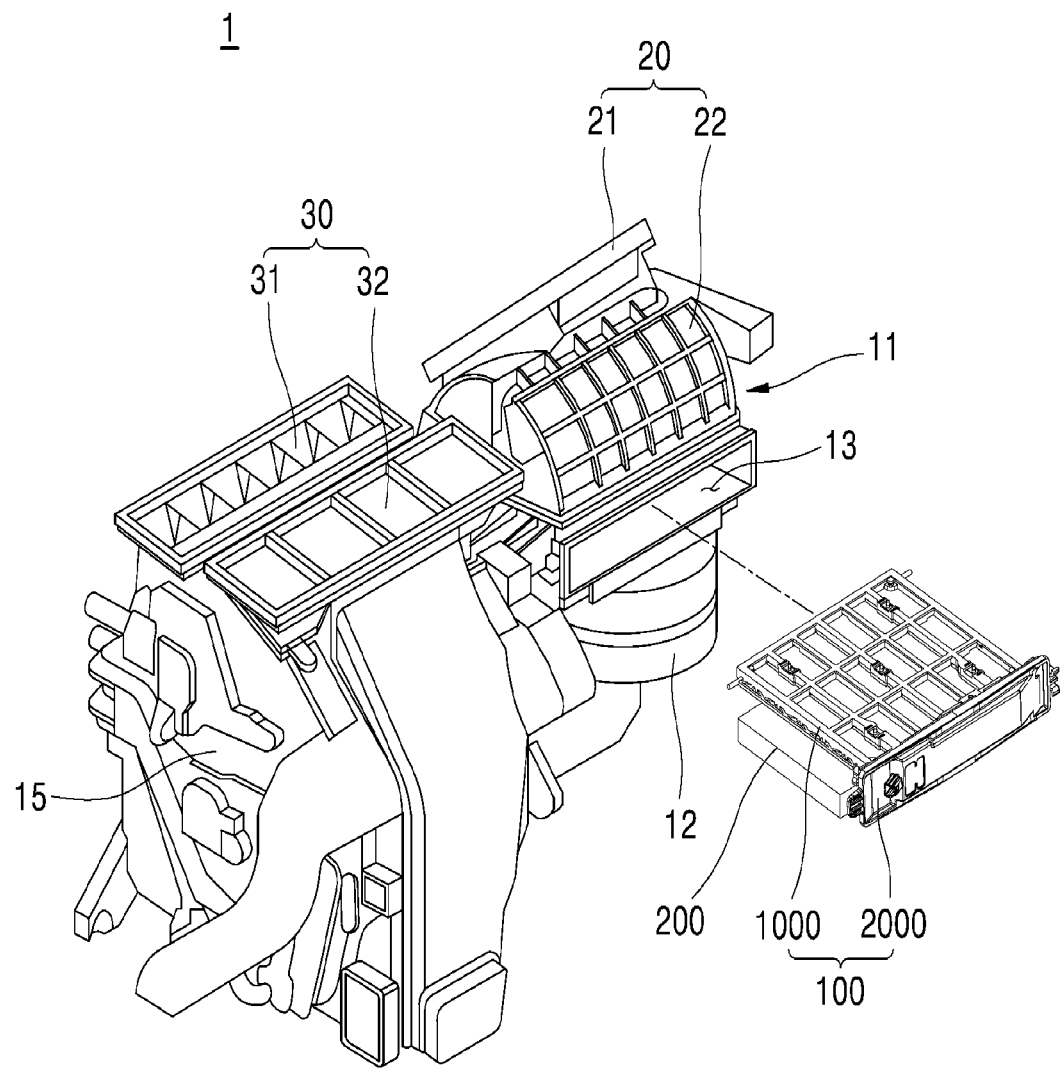
FIG. 1 is a perspective view showing an example of an air conditioner for vehicle and an electrification device for electric dust collection.

Some embodiments of the present disclosure are described in detail with reference to accompanying drawings, such that a person having ordinary knowledge in the art to which the present disclosure pertains may easily implement the technical idea of the present disclosure. A detailed description of a well-known technology relating to the present disclosure may be omitted if it unnecessarily obscures the gist of the present disclosure. One or more embodiments of the present disclosure are described in detail with reference to the accompanying drawings. Same reference numerals may be used to refer to same or similar components.

It will be understood that, the terms "first", "second", and the like may be used herein to describe various components; however, these components should not be limited by these terms. These terms are only used to distinguish one component from another component. Thus, a first component may be a second component unless otherwise stated.

Unless otherwise stated, each component may be singular or plural through the disclosure.

In this document, the terms "upper," "lower," "on," "under," or the like are used such that, where a first component is arranged at "an upper portion" or "a lower portion" of a second component, the first component may be arranged in contact with the upper surface or the lower surface of the second component, or another component may be disposed between the first component and the second component. Similarly, where a first component is arranged on or under a second component, the first component may be arranged directly on or under (in contact with) the second component, or at least one other components may be disposed between the first component and the second component.

Further, the terms "connected," "coupled," or the like are used such that, where a first component is connected or coupled to a second component, the first component may be directly connected or able to be connected to the second component, or at least one additional components may be disposed between the first and second components, or the first and second components may be connected or coupled through at least one additional components.

In some examples, singular expressions used in the present disclosure include plural expressions unless the context clearly indicates otherwise. In the present disclosure, terms such as "including" or "comprising" should not be construed as necessarily including all of the various components, or various steps described in the present disclosure, and terms such as "including" or "comprising" should be construed as not including some elements or some steps or further including additional elements or steps.

In some examples, singular expressions used in the present disclosure include plural expressions unless the context clearly indicates otherwise. In the present disclosure, terms such as "including" or "comprising" should not be construed as necessarily including all of the various components, or various steps described in the present disclosure, and terms such as "including" or "comprising" should be construed as not including some elements or some steps or further including additional elements or steps.

In the present disclosure, unless otherwise stated, "A and/or B" means A, B, or both. Unless otherwise stated, "C to D" means "C or more and D or less".

Hereinafter, the present disclosure is described with reference to the drawings for explaining an electrification apparatus for electric dust collection 100 according to embodiments of the present disclosure.

Figure 2:
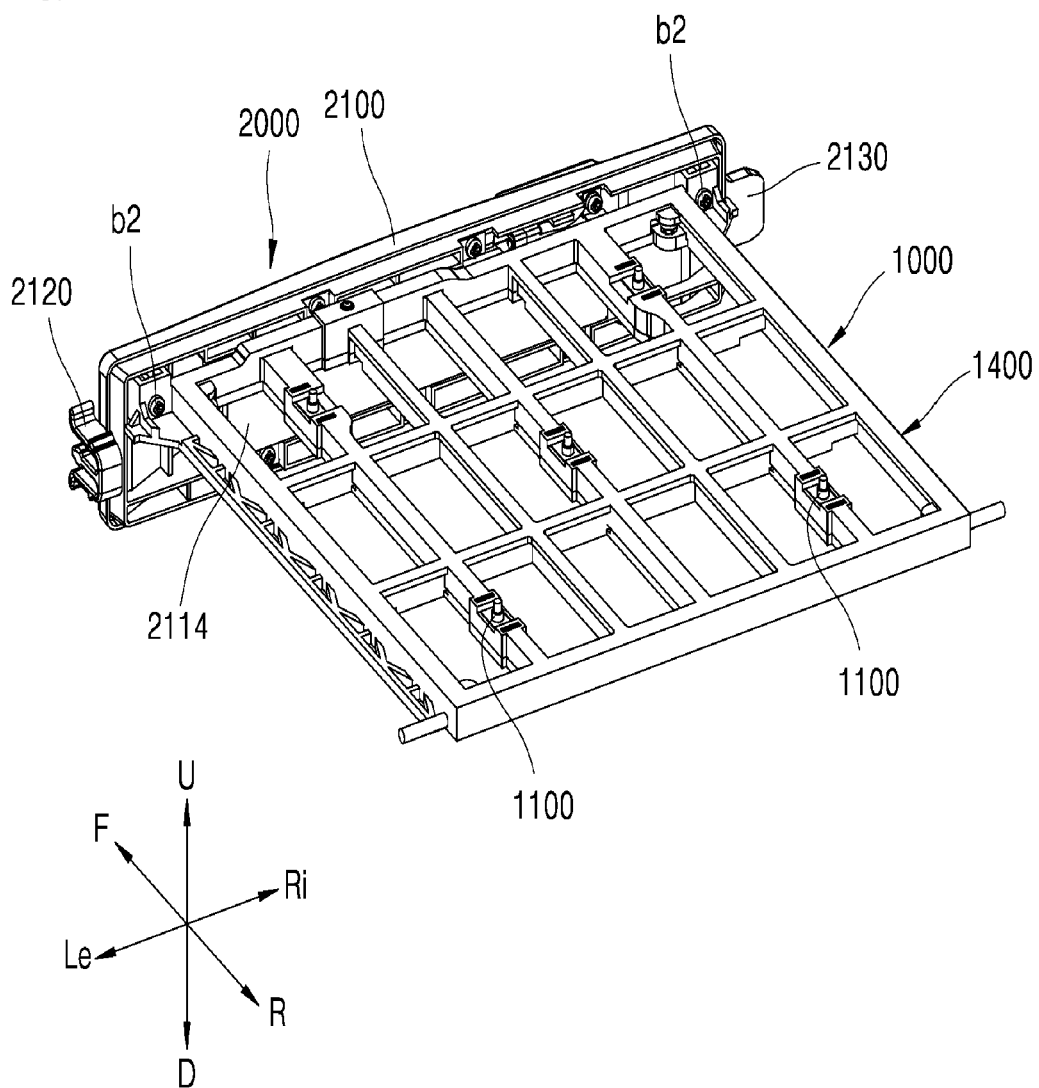
FIG. 2 is a rear perspective view showing the electrification apparatus for electric dust collection in FIG. 1.
Figure 3:
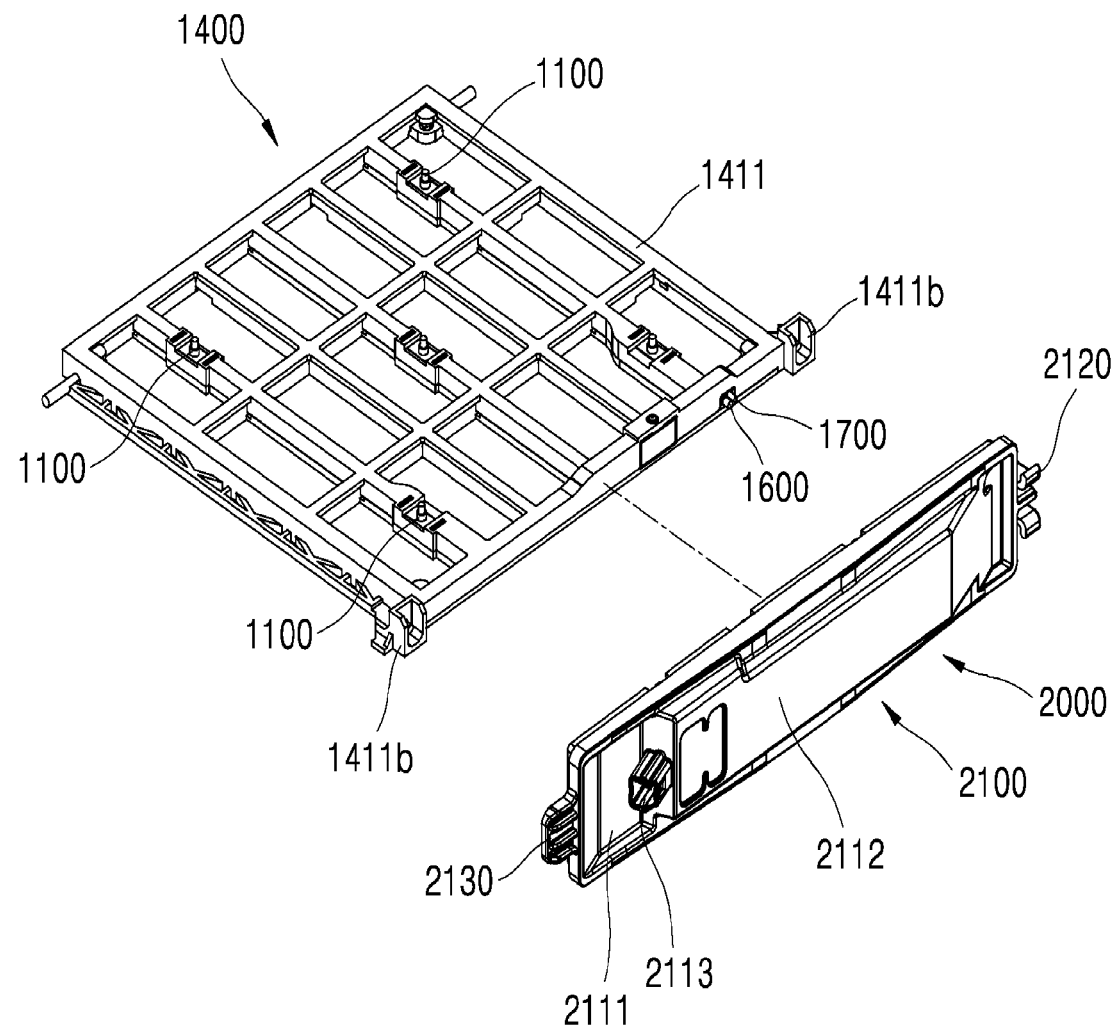
FIG. 3 is an exploded perspective view showing the electrification apparatus for electric dust collection in FIG. 2.

With reference to FIGS. 1 to 3, an assembly structure of the electrification apparatus for electric dust collection 100 and an air conditioner for vehicle 1 according to an embodiment of the present disclosure is described schematically and the assembly structure is described schematically.

<Overall Configuration>

FIG. 1 is a perspective view showing an example of an electrification apparatus for electric dust collection 100 and an air conditioner for vehicle 1 in which the electrification apparatus for electric dust collection 100 is disposed.

As shown in FIG. 1, the electrification apparatus for electric dust collection 100 according to an embodiment of the present disclosure may be disposed in the air conditioner for vehicle 1.

However, the present disclosure is not limited thereto, and may be applied to various types air conditioners, for example, building air conditioners, household air conditioners, and air purifiers. Hereinafter, the electrification apparatus for electric dust collection 100 disposed in the air conditioner for vehicle 1 is described as an example.

The air conditioner for vehicle 1 may include main bodies 11 and 15 defining an outer appearance. The main body may include a suction main body 11 defining a suction inlet 20 and a discharge main body 15 defining a discharge outlet 30.

The suction main body 11 and the discharge main body 15 communicate with each other to flow air.

A plurality of suction inlets 20 may be defined in the suction main body 11 and a plurality of discharge outlets 30 may be defined in the discharge main body 15.

The suction inlet 20 may include an indoor suction inlet 21 and an outdoor suction inlet 22. The indoor suction inlet 21 may be an inlet through which internal air of a vehicle in which the air conditioner for vehicle 1 is installed is introduced into the main body 11. In addition, the outdoor suction inlet 22 may be an inlet through which external air of the vehicle is introduced into the main body 11.

The discharge outlet 30 may include a front discharge outlet 31 and a defrost discharge outlet 32. The front discharge outlet 31 may be an outlet through which air discharged from the main body 11 flows into the vehicle. In addition, the defrost discharge outlet 32 may be an outlet through which the air discharged from the main body 11 flows to the window of the vehicle.

In addition, the air conditioner for vehicle 1 may include a fan and a heat exchanger disposed in the main bodies 11 and 15.

In addition, the air conditioner for vehicle 1 may further include a damper to selectively open the plurality of suction inlets 20 and discharge outlets 30. For example, the damper may open a first one among the indoor suction inlet 21 and the outdoor suction inlet 22 and close a second one thereof. In addition, the damper may open at least one of the plurality of discharge outlets 30.

In addition, an electrification apparatus for electric dust collection 100 and a dust collecting apparatus 200 may each be disposed in the air conditioner for vehicle 1.

The electrification apparatus for electric dust collection 100 electrifies foreign substances such as dust particles in the air. In addition, the dust collecting apparatus 200 collects the dust particles or the like electrified by the electrification apparatus for electric dust collection 100 and remove the dust particles from the air.

The electrification apparatus for electric dust collection 100 may include an electrification module 1000 having a discharge tip 1100 and a conductive plate 1200 described below.

A high voltage is applied to the discharge tip 1100 and a ground electrode is applied to the conductive plate 1200. Accordingly, the electrification apparatus for electric dust collection 100 may generate ions in the air to form an electric field.

In this case, the conductive plate 1200 may generate an electric field by generating a potential difference with the discharge tip 1100. A detailed configuration of the electrification apparatus for electric dust collection 100 is described below with reference to FIG. 2.

The dust collecting apparatus 200 corresponds to a type of filter to collect particles electrified by the electrification apparatus for electric dust collection 100 and may be made of various materials.

For example, the dust collecting apparatus 200 may be configured as a porous filter made of a fiber such as a nonwoven fabric. In addition, a conductive material may be applied, coated, or attached to a surface of the dust collecting apparatus 200.

With this configuration, the dust particles or the like in the air passing through the electrification apparatus for electric dust collection 100 are combined with ions generated by the electrification apparatus for electric dust collection 100 and are electrified. In addition, the electrified dust particles may be collected by the electrification apparatus for electric dust collection 100 or the dust collecting apparatus 200.

The electrification apparatus for electric dust collection 100 according to an embodiment of the present disclosure may be provided as a separate device from the dust collecting apparatus 200.

The electrification apparatus for electric dust collection 100 and the dust collecting apparatus 200 may be produced and distributed by different manufacturing processes and distribution processes. In addition, the electrification apparatus for electric dust collection 100 and the dust collecting apparatus 200 may be coupled to each other by an additional coupling member and may be provided on the air conditioner for vehicle 1.

As shown in FIG. 1, the air conditioner for vehicle 1 includes a dust collecting installation portion 13 in which the electrification apparatus for electric dust collection 100 and the dust collecting apparatus 200 are disposed. For example, the dust collecting installation portion 13 is disposed in the suction main body 11 adjacent to the suction inlet 20.

In particular, the dust collecting installation portion 13 is disposed at a lower side in a flow direction of the air flowing into the suction inlet 20 to pass the air introduced into the suction inlet 20 through the electrification apparatus for electric dust collection 100 before the dust collecting apparatus 200.

In addition, the air conditioner for vehicle 1 includes a fan installation portion 12 in which a fan is installed. The fan installation portion 12 is disposed at the suction main body 11 adjacent to the suction inlet 20. In particular, the fan installation portion 12 is disposed under the dust collecting installation portion 13 in the air flow direction.

That is, the suction inlet 20, the dust collecting installation portion 13, and the fan installation portion 12 are sequentially disposed at the suction main body 11 in the air flow direction. In this structure, the air may be introduced into the suction inlet 20 and may sequentially pass through the electrification apparatus for electric dust collection 100, the dust collecting apparatus 200, and the fan, and may flow to the discharge main body 15.

The electrification apparatus for electric dust collection 100 and the dust collecting apparatus 200 may each be disposed in the dust collecting installation portion 13. In particular, the dust collecting apparatus 200 is disposed below the electrification apparatus for electric dust collection 100 in the air flow direction. In this structure, the air introduced into the suction inlet 20 may sequentially pass through the electrification apparatus for electric dust collection 100 and the dust collecting apparatus 200 and may flow.

The electrification apparatus for electric dust collection 100 may be disposed on the dust collecting apparatus 200. In that state, the electrification apparatus for electric dust collection 100 may be disposed in the dust collecting installation portion 13. That is, as shown, the electrification apparatus for electric dust collection 100 and the dust collecting apparatus 200 may overlap with each other and may be seated on the dust collecting installation portion 13.

As the electrification apparatus for electric dust collection 100 and the dust collecting apparatus 200 are individually disposed, the electrification apparatus for electric dust collection 100 and the dust collecting apparatus 200 may be managed separately. For example, a user may replace and wash the dust collecting apparatus 200 by separating only the dust collecting apparatus 200 from the air conditioner for vehicle 1.

In particular, replacement cycles of the electrification apparatus for electric dust collection 100 and the dust collecting apparatus 200 may be different from each other. As a larger amount of dust particles and the like are collected in the dust collecting apparatus 200, the replacement cycle of the dust collecting apparatus 200 may be shorter. Therefore, the user may replace only the dust collecting apparatus 200 without having to replace the electrification apparatus for electric dust collection 100, thereby improving user convenience.

<Configuration of Electrification Apparatus for Electric Dust Collection>

Hereinafter, an electrification apparatus for electric dust collection 100 according to an embodiment of the present disclosure is described.

FIG. 2 is a rear perspective view showing an example electrification apparatus for electric dust collection 100. FIG. 3 is an exploded perspective view showing an electrification module 1000 and a cover module 2000 separated from the electrification apparatus for electric dust collection 100 in FIG. 2.

Referring to FIGS. 2 and 3, the electrification apparatus for electric dust collection 100 according to an embodiment of the present disclosure may include an electrification module 1000 to electrify foreign substances such as dust particles contained in the passing air and a cover module 2000 disposed at a front side of the electrification module 1000.

The electrification module 1000 is entirely inserted into the dust collecting installation portion 13 and is directly exposed to the flowing air.

The cover module 2000 functions as a cap. For example, the cover module 2000 is coupled to an opening of a dust collecting installation portion 13 into which the electrification module 1000 is inserted to close the opening.

The cover module 2000 may include a cover 2100, which functions as the cap. A high voltage supplier 2200 is accommodated in the cover 2100 and generates a high voltage to supply the high voltage to the electrification module 1000. A high voltage cable 1600 to supply a voltage to the discharge tip 1100 and a grounding cable 1700 to ground a conductive plate 1200 described below may each be electrically connected to the high voltage supplier 2200.

As shown in FIG. 3, a protruding surface 2112 is defined on a front surface 2111 of the cover 2100 and at least partially protrudes forward. In this structure, a space to accommodate the high voltage supplier 2200 may be defined at a rear side of the protruding surface 2112.

As shown in FIG. 3, a main connector 2113 to supply external power to the high voltage supplier 2200 may be integrated with the front surface 2111 of the cover 2100 or may be provided separately from the front surface 2111 of the cover 2100.

A hook-shaped retainer 2120 and a locking protrusion 2130 may be defined at both sides of the cover module 2000 for detachable coupling to the dust collecting installation portion 13.

As shown in FIG. 3, the electrification module 1000 and the cover module 2000 may be detachably coupled to each other by a bolt b2. For example, a connector 1411b of the electrification module 1000 may be coupled to the rear surface of the cover 2100 using the bolt (b2).

<Detailed Configuration of Electrification Module>

Figure 4:
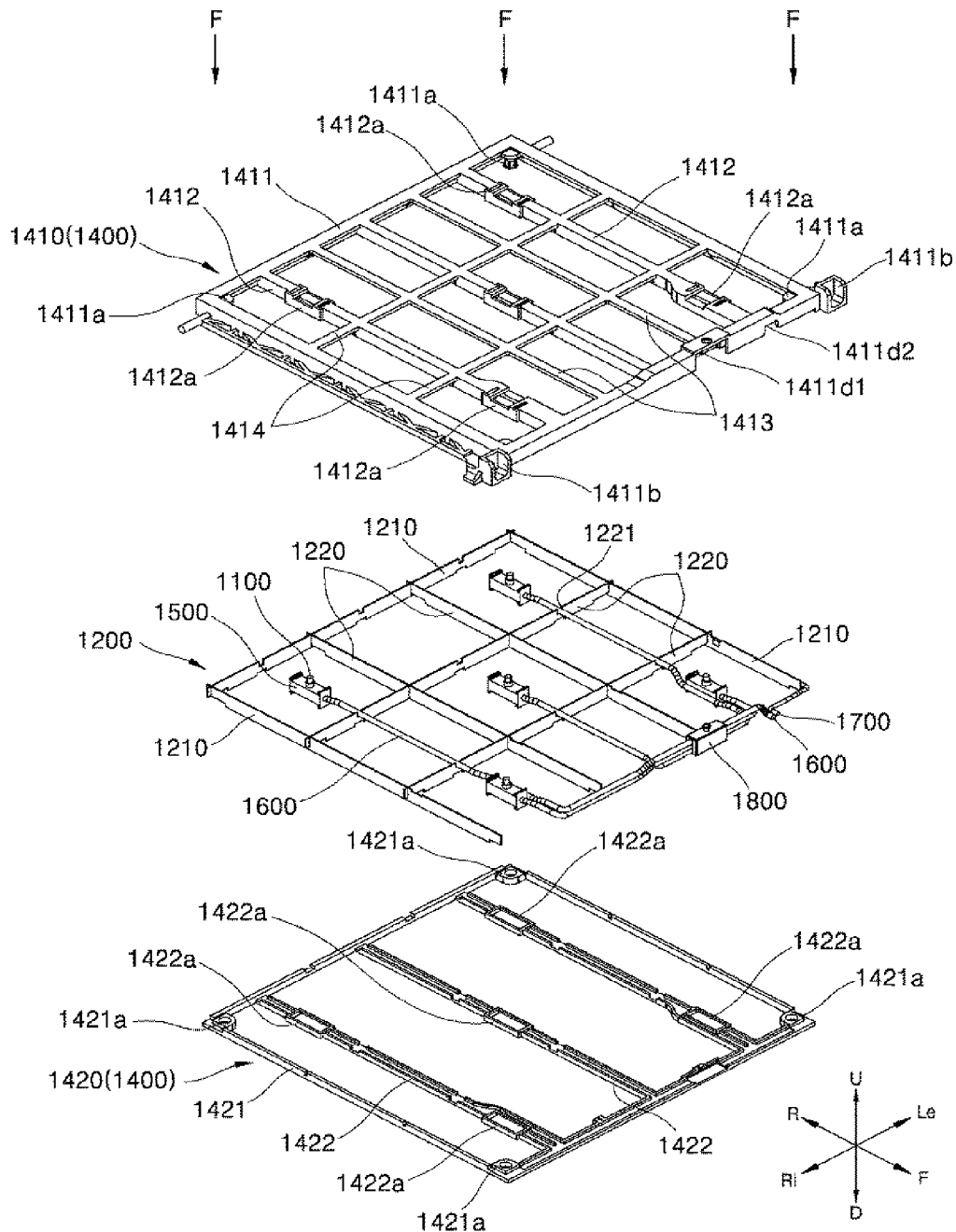
FIG. 4 is an exploded perspective view showing an electrification module in FIG. 3.
Figure 5:
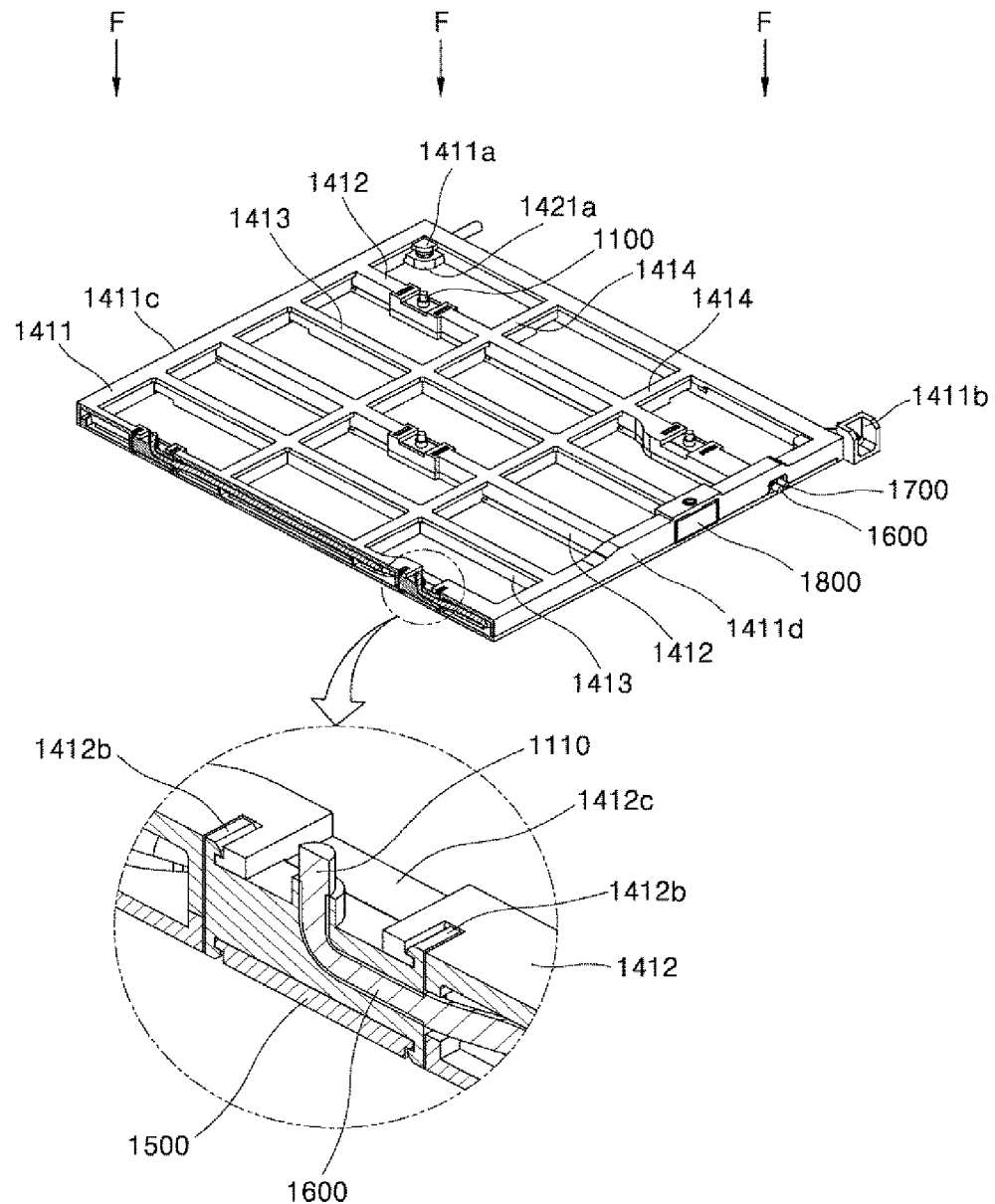
FIG. 5 is a front perspective view and a cross-sectional view showing the electrification module in FIG. 3.

FIG. 4 is an exploded perspective view showing an electrification module 1000. FIG. 5 is a cross-sectional view showing an electrification module 1000. FIGS. 6A, 6B, 7A, and 7B are partially enlarged views of a frame 1400.

Hereinafter, an electrification module 1000 of an electrification apparatus for electric dust collection 100 according to an embodiment of the present disclosure is described with reference to FIGS. 4 to 7B.

The electrification module 1000 may include a frame 1400 defining an outer appearance, a discharge tip 1100 disposed on the frame 1400, and a conductive plate 1200.

The conductive plate 1200 forms an electric field together with the discharge tip 1100. In addition, the conductive plate 1200 may be provided as a metal plate having a predetermined thickness, and a ground cable 1700 for grounding may be connected to the conductive plate 1200. In this case, a potential difference is generated between the conductive plate 1200 and the discharge tip 1100 to generate an electric field.

In addition, high-density ions may be generated between the discharge tip 1100 and the conductive plate 1200.

As the conductive plate 1200 is provided as a flat plate having the predetermined width along a vertical direction (i.e., a U-D direction), predetermined dust particles or the like may be collected on the conductive plate 1200. At least a portion of the conductive plate 1200 is covered by an upper frame 1400 described below to prevent direct adhesion of the dust particles to the conductive plate 1200.

The conductive plate 1200 surrounds the discharge tip 1100. For example, the conductive plate 1200 forms a predetermined electrification space surrounding the discharge tip 1100. In this case, the electrification space may be closed by the conductive plate 1200 in a front-rear direction (i.e., an F-R direction) and a lateral direction (i.e., an Le-Ri direction), and may be open in a vertical direction (i.e., a U-D direction).

In particular, the conductive plate 1200 defines a rectangular column-shaped electrification space. Advantageously, the electrification space may have a square column-shape to equalize a magnetic field and ion emission.

In this case, the discharge tip 1100 may be disposed at a center of the electrification space and may emit ions in a direction opposite to a flow direction (F) of the air.

The electrification space refers to a space to surround a discharge tip 1100. Accordingly, a number of electrification spaces may correspond to a number of discharge tips 1100.

In this embodiment, a total of nine electrification spaces are formed as an example. In this case, the discharge tips 1100 may be disposed in individual electrification spaces or may be disposed only in some electrification spaces.

The illustrated embodiment discloses a total of five discharge tips 1100, and the number of discharge tips 1100 may be adjusted based on a needed amount of ion emission or a flow rate of air. Hereinafter, as illustrated, a total of five discharge tips 1100 are disposed.

The conductive plate 1200 may include an outer plate 1210 defining a plurality of electrification spaces and an inner plate 1220 configured to partition the plurality of electrification spaces.

The outer plate 1210 forms an outer circumference of the conductive plate 1200. For example, the outer plate 1210 may have a rectangular frame shape.

In the present embodiment, a total of three outer plates 210 may form a U-shaped rectangular frame defining an opening at a front side thereof. As shown in FIG. 4, the outer plate 1210 may not be provided at a position adjacent to the cover module 2000 to avoid interference with the high voltage cable 1600 configured to supply voltage to the discharge tip 1100 and may be opened.

The inner plate 1220 divides the space formed by the outer plate 1210 into individual electrification spaces.

As shown, the inner plate 1220 extends in the front-rear direction (i.e., the F-R direction) or the lateral direction (i.e., the Le-Ri direction). For example, the inner plates 1220 may cross each other to divide the space formed by the outer plate 1210 into nine electrification spaces.

In this case, the outer plate 1210 and the inner plate 1220 may be integrated with each other, or may be separately manufactured and coupled to each other.

As shown in FIG. 4, the inner plate 1220 may include a notch 1221 through which a high voltage cable 1600 to supply a voltage to an individual discharge tip 1100 passes.

The frame 1400 defines an appearance of the electrification module 1000 and supports and fixes the discharge tip 1100 and the conductive plate 1200 at a predetermined position.

The frame 1400 may be made of a non-conductive material, for example, plastic. In addition, the frame 1400 may be formed in various shapes by an injection process.

The frame 1400 may include an upper frame 1410 disposed on the discharge tip 1100 and the conductive plate 1200 and a lower frame 1420 disposed under the discharge tip 1100 and the conductive plate 1200.

The upper frame 1410 and the lower frame 1420 may be detachably coupled to each other. For the detachable coupling, the upper frame 1410 may include a plurality of coupling hooks 1411a that protrude and extend toward the lower frame 1420. For example, the individual coupling hooks 1411a may be disposed along a circumferential direction thereof and may be disposed at four corner sides of an upper outer frame 1411 described below.

The lower frame 1420 may include a ring-shaped coupling ring 1421a into which the coupling hook 1411a is inserted and with which the coupling hook 1411a is engaged. As the coupling hook 1411a is inserted into an insertion hole of the coupling ring, the coupling hook 1411a may be engaged with the coupling ring.

However, this is merely an example, and other fastening means or coupling means may be provided.

As the upper frame 1410 and the lower frame 1420 are coupled to each other, the outer plate 1210 of the conductive plate 1200 and the discharge tip 1100 may be disposed and supported between the upper frame 1410 and the lower frame 1420.

A detailed configuration of the frame 1400 is described below with reference to FIGS. 5 to 7.

The discharge tip 1100 ionizes molecules in the air by high-voltage discharge. For example, the discharge tip 1100 may generate an anion such as OH– and O– or a cation such as H+ in the air.

A high voltage cable 1600 may be connected to the discharge tip 1100 to supply a high voltage.

In addition, the discharge tip 1100 may include a discharge brush 1110 to directly generate discharge. For example, the discharge brush 1110 may be made of a plurality of carbon fibers. The carbon fiber may include microfibers having a diameter of a micrometer unit, and when a high voltage is applied to the carbon fiber through the high voltage cable 1600, ions may be generated in the air by corona discharge.

The discharge tip 1100 is disposed on the frame 1400 and extends in the vertical direction (i.e., the U-D direction), and preferably protrudes in a direction opposite to a flow direction (F) of air. Therefore, a diffusion effect of the emitted ions may be maximized and the dust particles contained in the air may be evenly electrified.

The discharge tip 1100 may be firmly supported by the tip holder 1500 and may be firmly coupled to the frame 1400 using the tip holder 1500.

Figure 8:
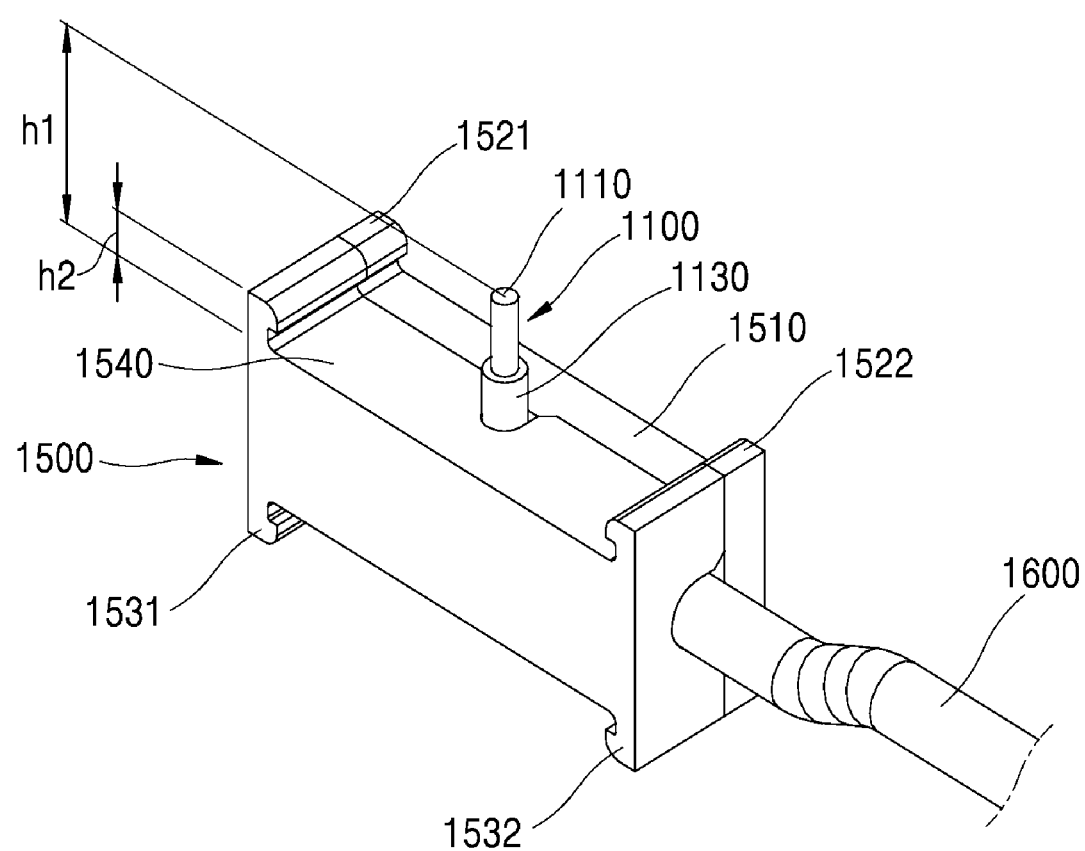
FIG. 8 is a perspective view showing a discharge tip and a tip holder in FIG. 3.
Figure 9:
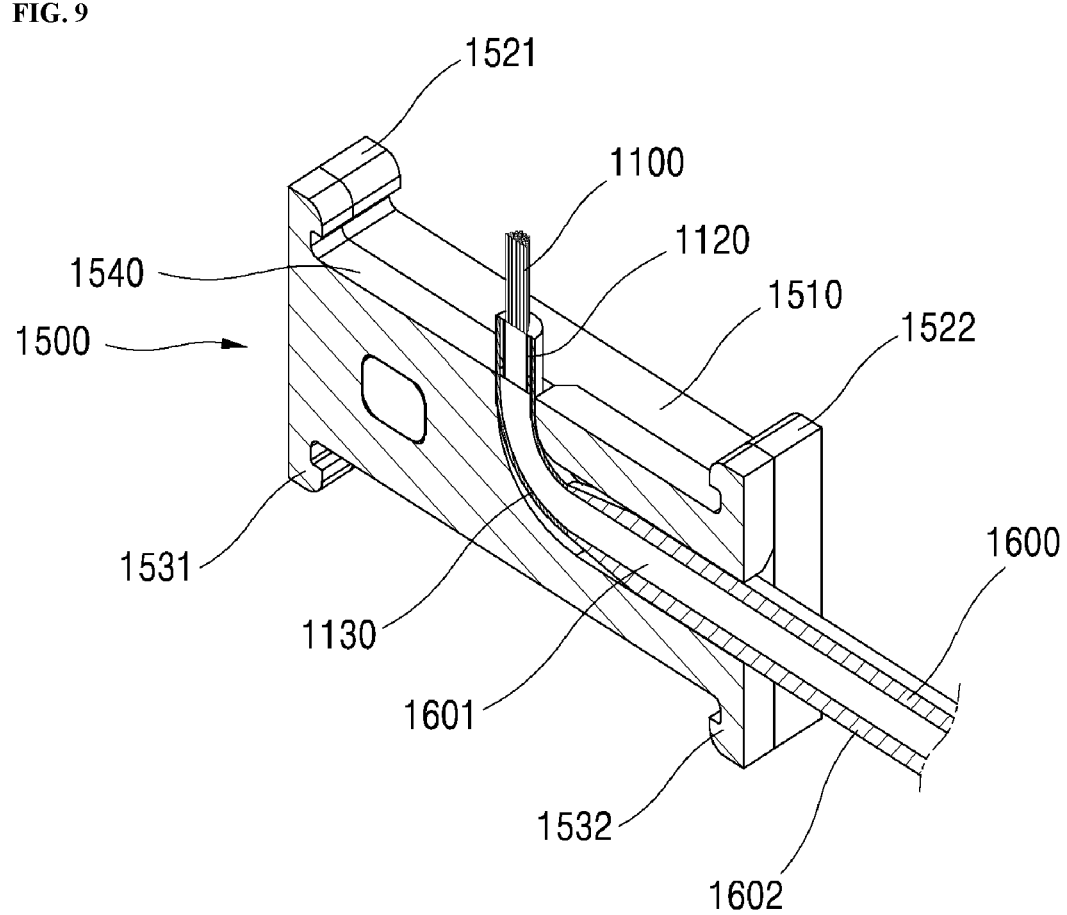
FIG. 9 is a cross-sectional view showing the discharge tip and the tip holder in FIG. 8.
Figure 10:
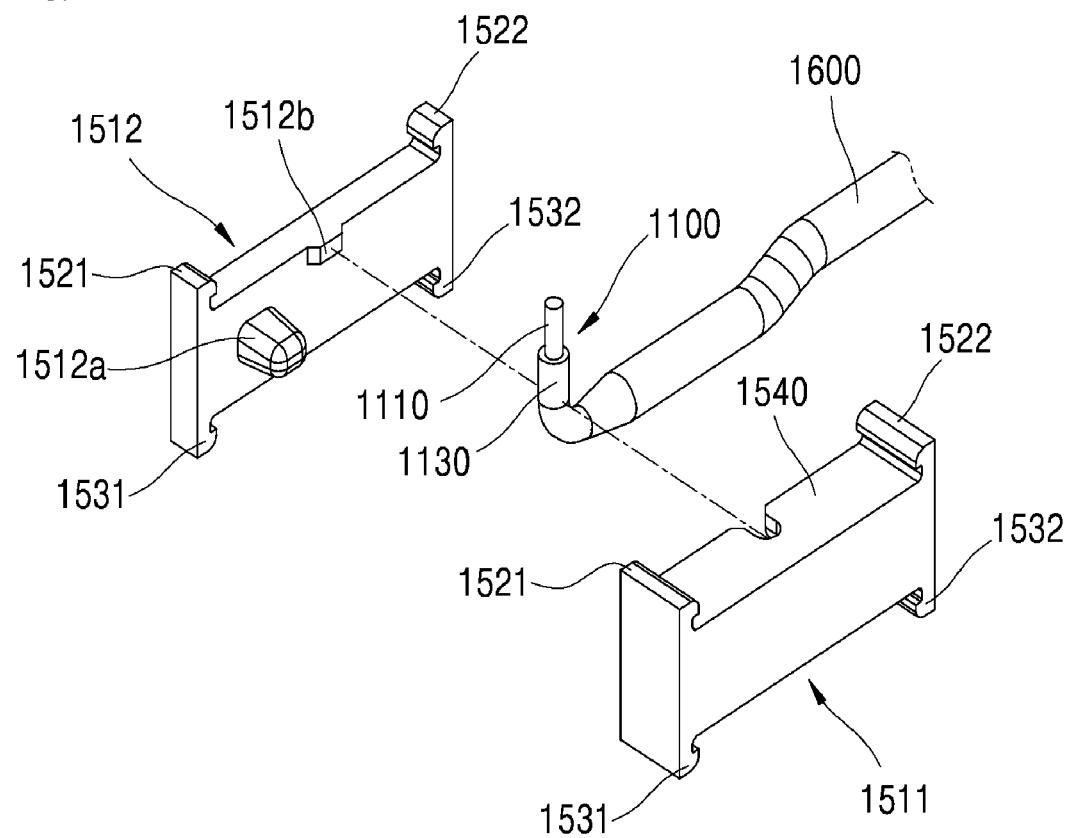
FIGS. 10 and 11 are exploded perspective views showing the discharge tip and the tip holder in FIG. 8
Figure 11:
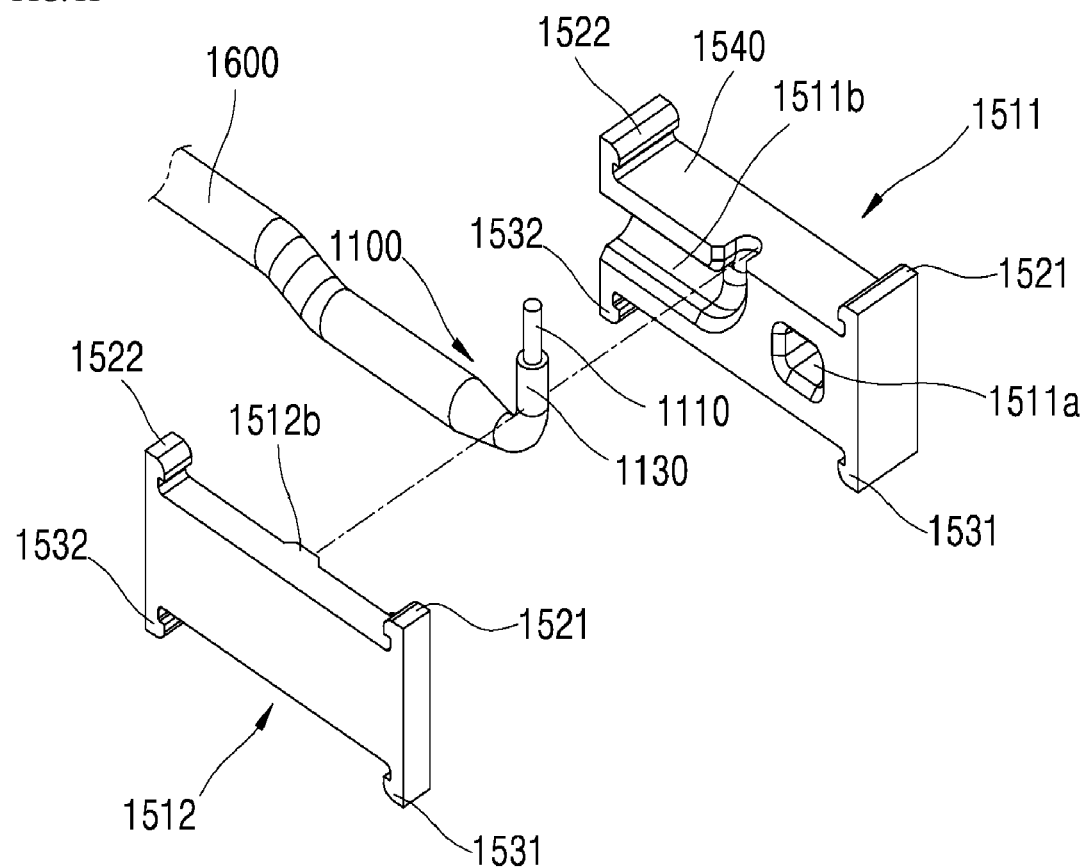

Detailed configurations of the discharge tip 1100 and the tip holder 1500 are described below with reference to FIG. 8.

<Detailed Configuration of Frame>

Hereinafter, a detailed configuration of a frame 1400 of an electrification module 1000 according to an embodiment of the present disclosure is described with reference to FIGS. 5 to 7B.

Figure 6A:
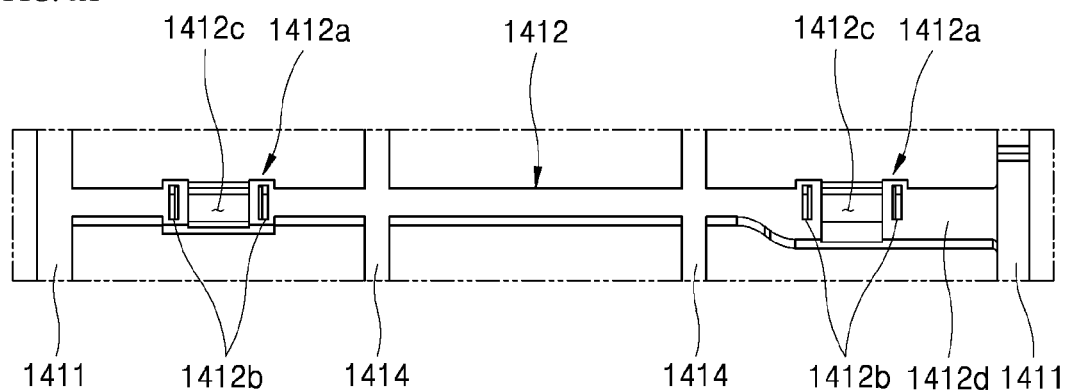
FIGS. 6A and 6B are partially enlarged views showing an upper frame in FIG. 5.
Figure 6B:
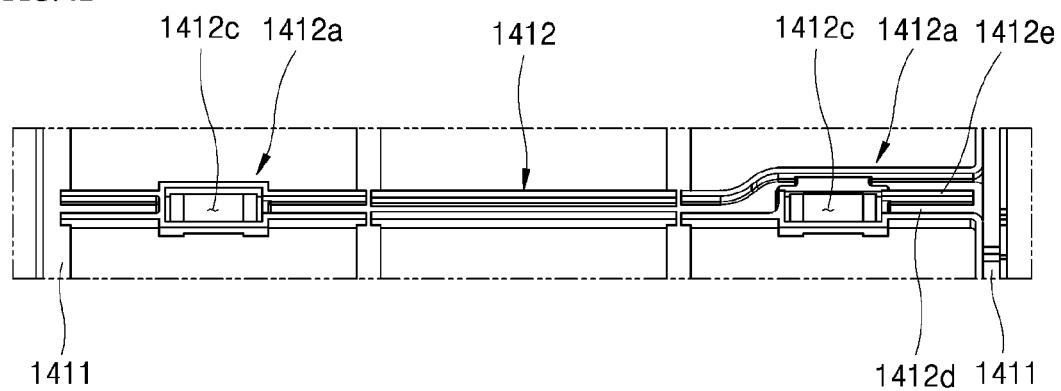

As shown in FIGS. 5, 6A, and 6B, the frame 1400 includes an upper frame 1410 configured to support a conductive plate 1200 and a tip holder 1500 of a discharge tip 1100 from a top thereof or cover the conductive plate 1200 and the tip holder 1500 of the discharge tip 1100.

The upper frame 1410 includes an upper outer frame 1411, a first upper inner frame 1412, a second upper inner frame 1413, and a third upper inner frame 1414.

The upper outer frame 1411 corresponds to an outermost portion thereof and is a rectangular outer edge having a predetermined height.

The upper outer frame 1411 has a U-shaped cross-section and defines an opening at a lower surface thereof, and an outer plate 1210 disposed outside of the conductive plate 1200 is partially accommodated in the U-shaped inner space. That is, an upper surface of the outer plate 1210 is covered by the upper outer frame 1411.

A high voltage cable 1600 and a cable holder 1800 described below are each accommodated in an inner space of a front end 1411*d* of the upper outer frame 1411 corresponding to a portion of the conductive plate 1200 in which the outer plate 1210 is not disposed.

A first notch 1411*d*1 having an outer shape corresponding to that of the cable holder 1800 may be defined in the portion where the cable holder 1800 is accommodated and a second notch 1411*d*2 may be defined to pass through the high voltage cable for connecting one end of the high voltage cable to the high voltage supplier 2200.

The first upper inner frame 1412 extends from an inside of the upper outer frame 1411 in the front-rear direction (i.e., the F-R direction) and may be integrated with the upper outer frame 1411.

Similar to the upper outer frame 1411, the first upper inner frame 1412 defines an opening at a lower portion thereof, has a U-shaped cross section, and accommodates the high voltage cable 1600 configured to supply voltage to the discharge tip 1100 at an inside of the U-shaped structure.

In addition, the first upper inner frame 1412 includes a first coupling portion 1412*a* to which an upper surface of the tip holder 1500 described below is coupled.

As shown in FIGS. 5 and 6A, the first coupling portion 1412*a* has an inner shape corresponding to an outer shape of an upper portion of the tip holder 1500. A first coupling hole 1412*b* is defined on an upper surface of the first coupling portion 1412*a* and an upper hook 1521, 1522 of the tip holder 1500 described below passes through the first coupling hole 1412*b*.

In addition, the upper surface of the first coupling portion 1412*a* except for the first coupling holes 1412*b* is mostly open and the discharge tip 100 coupled to the tip holder 1500 is exposed to outside through an opening hole 1412*c*.

As shown in the enlarged view of FIG. 5, the open hole 1412*c* may extend to both sides of the first upper inner frame 1412. That is, the open hole 1412*c* may be formed by cutting the upper surface of the first coupling portion 1412*a* to a predetermined depth, thereby minimizing interference between the discharge tip 1100 and the first coupling portion 1412*a* and maximizing the discharge efficiency of the discharge tip 1100.

The first upper inner frame 1412 disposed immediately adjacent to the upper outer frame 1411 may include two first couplings 1412*a* to which two tip holders 1500 may be coupled.

In this case, as shown in FIGS. 6A and 6B, a first extension portion 1412*d* may be disposed at the first coupling portion 1412*a*, which is provided adjacent to the front end 1411*d* of the upper outer frame 1411, to pass through the high voltage cable 1600 configured to supply power to the discharge tip 1100 disposed adjacent to the rear end 1411*c*.

The high voltage cable 1600 avoids and bypasses the first coupling portion 1412*a*, which is disposed adjacent to the front end 1411*d* of the upper outer frame 1411 and moves toward the rear end 1411*c* to supply the power to the discharge tip 1100 disposed adjacent to the rear end 1411*c* of the upper outer frame 1411 through the first extension portion 1412*d*.

In this case, as shown in FIG. 6B, a first partition wall 1412*e* may be disposed between the first extension portion 1412*d* and the front end 1411*d* of the upper outer frame 1411 to separately accommodate two high voltage cables 1600. The first partition wall 1412*e* extends in a linear shape and divides an inner space that extends from the front end 1411*d* of the upper outer frame 1411 to the first coupling portion 1412*a* together with a second partition wall 1422*e* described below.

The second upper inner frame 1413 is disposed inside the upper outer frame 1411, and extends in the front-rear direction (i.e., F-R direction) in parallel to the first upper inner frame 1412.

The second upper inner frame 1413 covers an upper surface of the inner plate 1220 that extends in the front-rear direction (i.e., the F-R direction) to minimize a rate at which electrified dust particles are directly adhered to the inner plate 1220.

As shown, the first upper inner frame 1412 and the second upper inner frame 1413 are alternately arranged in parallel to each other.

The third upper inner frame 1414 extends inside the upper outer frame 1411 in a direction crossing each of the first upper inner frame 1412 and the second upper inner frame 1413.

Similar to the second upper inner frame 1413, the third upper inner frame 1414 covers the upper surface of the inner plate 1220 that extends in the lateral direction (i.e., the Le-Ri direction).

That is, the third upper inner frame 1414 and the second upper inner frame 1413 form a grid structure having an intersection point to at least partially cover and support the upper surface of the inner plate 1220 of the conductive plate 1200 having the same grid structure.

Figure 7A:
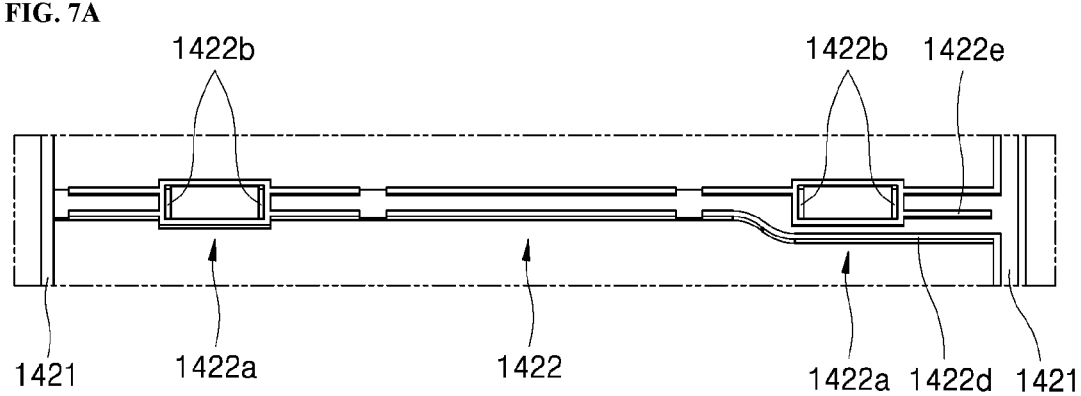
FIGS. 7A and 7B are partially enlarged views showing a lower frame in FIG. 5.
Figure 7B:
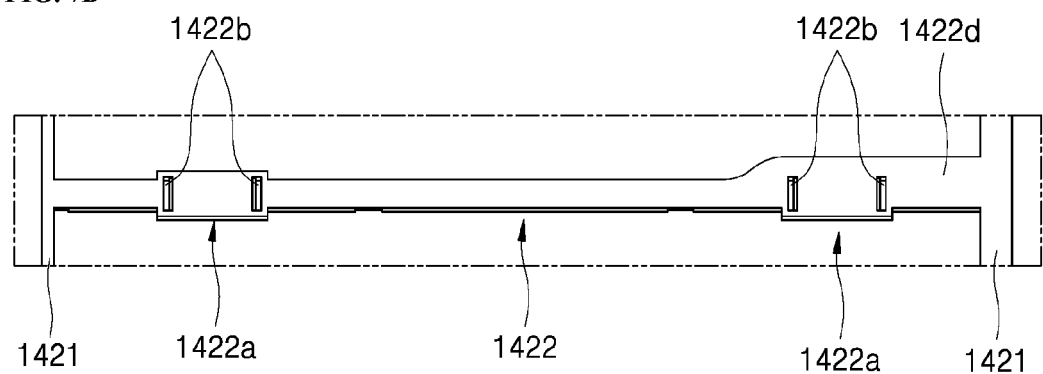

As shown in FIGS. 4 and 7B, the lower frame 1420 to support the conductive plate 1200 and the tip holder 1500 from under the conductive plate 1200 and the tip holder 1500 includes a lower outer frame 1421 and a lower inner frame 1422.

The lower outer frame 1421 corresponds to an outermost portion thereof, has a shape corresponding to that of the upper outer frame 1411 of the upper frame 1410, and is coupled to the opened lower surface of the upper outer frame 1411.

In this case, the outer plate 1210 of the conductive plate 1200 may be entirely accommodated by the upper outer frame 1411 and the lower outer frame 1421.

The lower inner frame 1422 is coupled to an opened lower surface of the first upper inner frame 1412 and extends in the front-rear direction (i.e., the F-R direction) similar to the first upper inner frame 1412.

The lower inner frame 1422 includes a second coupling portion 1422a corresponding to the first coupling portion 1412a. A lower surface of the tip holder 1500 described below is coupled to the second coupling portion 1422a.

The second coupling portion 1422a has an inner shape corresponding to an outer shape of the lower surface of the tip holder 1500, and a second coupling hole 1422b is defined at a lower surface of the second coupling portion 1422a and a lower hook 1531, 1532 of the tip holder 1500 described below passes through the second coupling hole 1422b.

The lower inner frame 1422 disposed immediately adjacent to the lower outer frame 1421 may include two second coupling portions 1422a to be coupled to the two tip holders 1500.

A second extension portion 1422d is disposed at the second coupling portion 1422a, which is disposed adjacent to the front end of the lower outer frame 1421, to pass through a high voltage cable 1600 configured to supply power to the discharge tip 1100 disposed adjacent to the rear end of the lower outer frame 1421.

The high voltage cable 1600 avoids and bypasses the second coupling portion 1422a disposed adjacent to the front end of the lower outer frame 1421 and is moved toward the rear end thereof to supply the power to the discharge tip 1100 disposed adjacent to the rear end of the lower outer frame 1421 through the second extension portion 1422d.

In this case, as shown in FIG. 7A, a second partition wall 1422e may be disposed between the second extension portion 1422d and the front end of the lower outer frame 1421 to separately accommodate two high voltage cables 1600. The second partition wall 1422e extends linearly and divides an inner space that extends from the front end of the lower outer frame 1421 to the second coupling portion 1422a together with the first partition wall 1412e.

<Detailed Configuration of Discharge Tip and Tip Holder>

Hereinafter, detailed configurations of a discharge tip 1100 and a tip holder 1500 of an electrification module 1000 according to an embodiment of the present disclosure are described with reference to FIGS. 8 to 12.

The electrification module 1000 according to the present disclosure includes a plurality of discharge tips 1100 and a plurality of tip holders 1500. Description below applies almost the same to the individual discharge tip 1100 and the tip holder 1500 unless otherwise noted.

Figure 12:
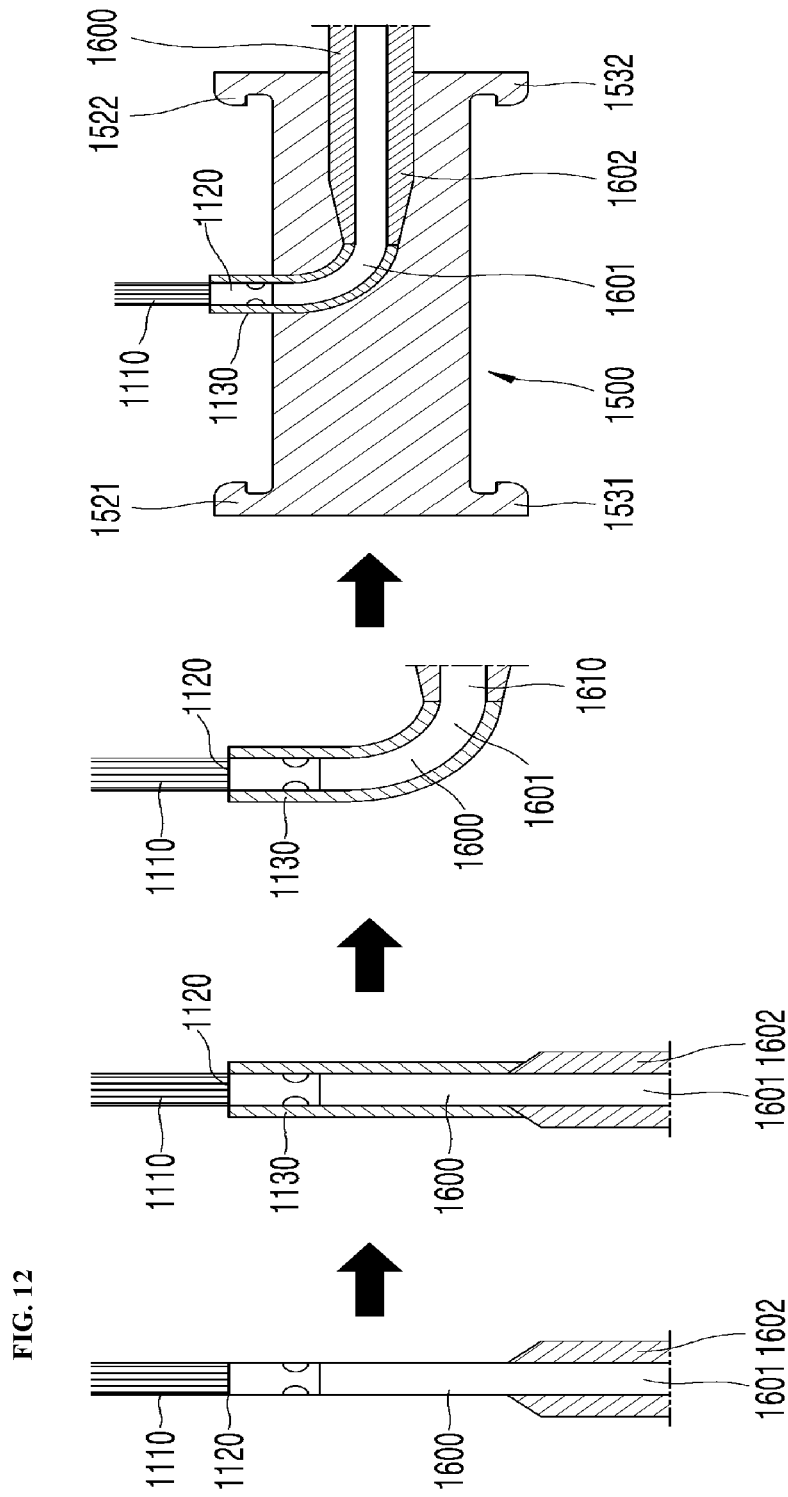
FIG. 12 shows an example process of manufacturing a discharge tip and a tip holder.

FIGS. 8 to 11 show a tip holder 1500 according to a first embodiment. FIG. 12 shows a tip holder 1500 according to a second embodiment.

The tip holder 1500 of the electrification apparatus for electric dust collection 100 according to an embodiment of the present disclosure may be manufactured separately from the discharge tip 1100 and a high voltage cable 1600 and coupled to the discharge tip 1100 and the high voltage cable 1600, or may be manufactured by insert injection in a state in which the discharge tip 1100 and the high voltage cable 1600 are disposed in a mold.

A configuration in which the tip holder 1500 is separately manufactured according to the first embodiment is described with reference to FIGS. 8 to 11.

The tip holder 1500 includes a hexahedral main body 1510 to support the discharge tip 1100 and the high voltage cable 1600, and the main body 1510 includes a first half body 1511 and a second half body 1512. The first half body 1511 and the second half body 1512 may be manufactured separately from the discharge tip 1100 and the high voltage cable 1600 by injection molding.

The discharge tip 1100 and the high voltage cable 1600 are pressed and supported by the first half body 1511 and the second half body 1512 in a state in which the discharge tip 1100 and the high voltage cable 1600 are at least partially disposed between the first half body 1511 and the second half body 1512.

The first half body 1511 includes a cable seating groove 1511 to accommodate the high voltage cable 1600 and the discharge tip 1100 and having a shape corresponding to outer shapes of a heat shrinkable tube 1130 to support the discharge tip 1100 and the high voltage cable 1600.

In addition, the first half body 1511 has a larger thickness than that of the second half body 1512 described below to accommodate the high voltage cable 1600 and the discharge tip 1100.

A coupling groove 1511a is defined in the first half body 1511 to couple to the second half body 1512 and a coupling protrusion 1512a of the second half body 1512 is inserted into the coupling groove 1511a.

The second half body 1512 is coupled to one surface of the first half body 1511 defining the cable seating groove 1511 to prevent the high voltage cable 1600 and the discharge tip 1100 from being separated and maintains a press state for the high voltage cable 1600 and the discharge tip 1100.

A pressing protrusion 1512b configured to press a heat shirkable tube 1130 is defined at one surface of the second half body 1512 facing the first half body 1511 to fix the position of the discharge tip 1100 and prevent the separation of the discharge tip 1100.

In addition, a coupling protrusion 1512a is defined at one side of the second half body 1512 facing the first half body 1511 to couple to the first half body 1511.

As shown, a pair of upper hooks 1521, 1522 are disposed on the upper surface of each of the first half body 1511 and the second half body 1512, a pair of lower hooks 1531, 1532 are disposed on the lower surface of each of the first half body 1511 and the second half body 1512, and something has the substantially same shape as something.

In this case, the pair of upper hooks 1521, 1522 and the pair of lower hooks 1531, 1532 are each spaced apart from the discharge tip 1100 to prevent interference with the discharge tip 1100. Advantageously, the upper hook 1521, 1522 may include a rear upper hook 1521 disposed at a rearmost side of the upper surface 1540 of the main body 1510 and a front upper hook 1522 disposed at a foremost side of the main body 1510.

Similarly, the lower hook 1531, 1532 may include a rear lower hook 1531 disposed at a rearmost side of a lower surface of the main body 1510 and a front lower hook 1532 disposed at a foremost side of the lower surface of the main body 1510.

In addition, the pair of upper hooks 1520 and the pair of lower hooks 1531, 1532 are deformed in a direction away from each other when the pair of upper hooks 1521, 1522 and the pair of lower hooks 1531, 1532 are coupled to the first coupling hole 1412*b* and the second coupling hole 1422*b* to minimize the interference with the discharge tip 1100.

In addition, for the same reason, a height (h1) at which the discharge tip 1100 protrudes from the upper surface 1540 may be larger than a height (h2) at which the upper hook 1521, 1522 protrudes from the upper surface 1540.

The tip holder 1500 may be manufactured by the insert injection in the state in which the discharge tip 1100 and the high voltage cable 1600 are disposed in the mold.

Referring to FIG. 12, a tip holder 1500 and a discharge tip 1100 manufactured by insert injection according to a second embodiment are described.

As shown in FIG. 12, one end of a discharge brush 1110 in the form of a carbon brush is connected to one end of a core wire 1601 of a high voltage cable 1600 through a terminal 1120. One end of the core wire 1601 of the high voltage cable 1600 is exposed to the outside with a cable sheath 1602 peeled off.

When one end of the discharge brush 1110 contacts one end of the core wire 1601 of the high voltage cable 1600, the terminal 1120 covers a contact point in a circumferential direction and presses the contact point thereof.

The discharge brush 1110 of the discharge tip 1100 may be electrically connected to the cable 1600 through the terminal 1120.

A heat shrinkable tube 1130 surrounds at least the contact point between the discharge brush 1110 and the terminal 1120 as shown in FIG. 12. In this case, the heat shrinkable tube 1130 may extend to the contact point between the cable 1600 and the terminal 1120.

As described below, the heat shrinkable tube 1130 preferably extends to a portion of a lower end of the discharge brush 1110 through the contact point between the discharge brush 1110 and the terminal 1120 and covers the contact point between the discharge brush 1110 and the terminal 1120 and the portion of the lower end of the discharge brush 1110 to prevent damage to the discharge brush 1110 by injection pressure.

After the heat shrinkable tube 1130 is disposed, the heat shrinkable tube 1130 is heated to shrink. The contact point between the discharge brush 1110 and the terminal 1120 maintains a first airtight state based on the shrinkage of the heat shrinkable tube 1130.

As shown in FIG. 12, a cable 1600 is bent at a predetermined angle to set an orientation angle of a discharge brush 1110.

FIG. 12 shows a bending portion 1610 bent to make the discharge brush 1110 be almost perpendicular to a horizontal plane, but a bending angle of the bending portion 1610 may be adjusted according to the specifications of products and orientation angles thereof.

In particular, the angle of the bending portion 160 may be adjusted to direct the remaining portion of the discharge tip 1100 among the five discharge tips 1100 except for the discharge brush 1110 disposed at a center of the discharge tip 1100 inward.

After the orientation angle of the discharge brush 1110 of the discharge tip 1100 is set, the discharge brush 1110, the terminal 1120, and the cable 1600 are moved into a cavity of the mold in the state in which the orientation angle of the discharge brush 1110 is set to perform the insert injection.

In this case, the discharge brush 1110 is not advantageously directly exposed to the injection pressure, and the heat shrinkable tube 1130 is not advantageously at least partially disposed at an outside of the cavity to minimize an effect of the injection pressure. That is, after the insert injection is performed, a portion of the heat shrinkable tube 1130 may protrude outward from an upper surface 1540 of the tip holder 1500 and may be exposed to the outside thereof, and the remaining portion thereof may be disposed inside the tip holder 1500.

As shown in FIG. 12, a contact point between a discharge brush 1110 and a terminal 1120 is disposed at an outside of a cavity of a mold and a contact point between a cable 1600 and the terminal 1120 may be at least partially disposed inside the cavity of the mold.

After the contact portion is disposed in the cavity of the mold, insert injection is performed to form a tip holder 1500.

When the injection is completed, as shown, a contact point between a cable 1600 and a terminal 1120 is at least partially disposed in the tip holder 1500. In this case, the contact point maintains a second airtight state.

Therefore, a processing deviation of an assembly including the discharge brush 1110, the cable 1600, and the tip holder 1500 may be significantly reduced compared to the related art by manufacturing by the insert injection, and moisture penetration into the contact point between the discharge tip 1100 and the cable 1600 may be fundamentally blocked.

In addition, as the contact point between the discharge brush 1110 and the cable 1600 is firmly supported by the tip holder 1500 formed by the insert injection, a possibility of disconnection between the discharge tip 1100 and the cable 1600 may be significantly lowered due to vibration and shock.

<Connection Structure of High Voltage Cable>

Hereinafter, an arrangement structure of a discharge tip 1100 and a connection structure of a high voltage cable 1600 to supply a voltage to the discharge tip 1100 are described with reference to FIGS. 13 and 14.

Figure 13:
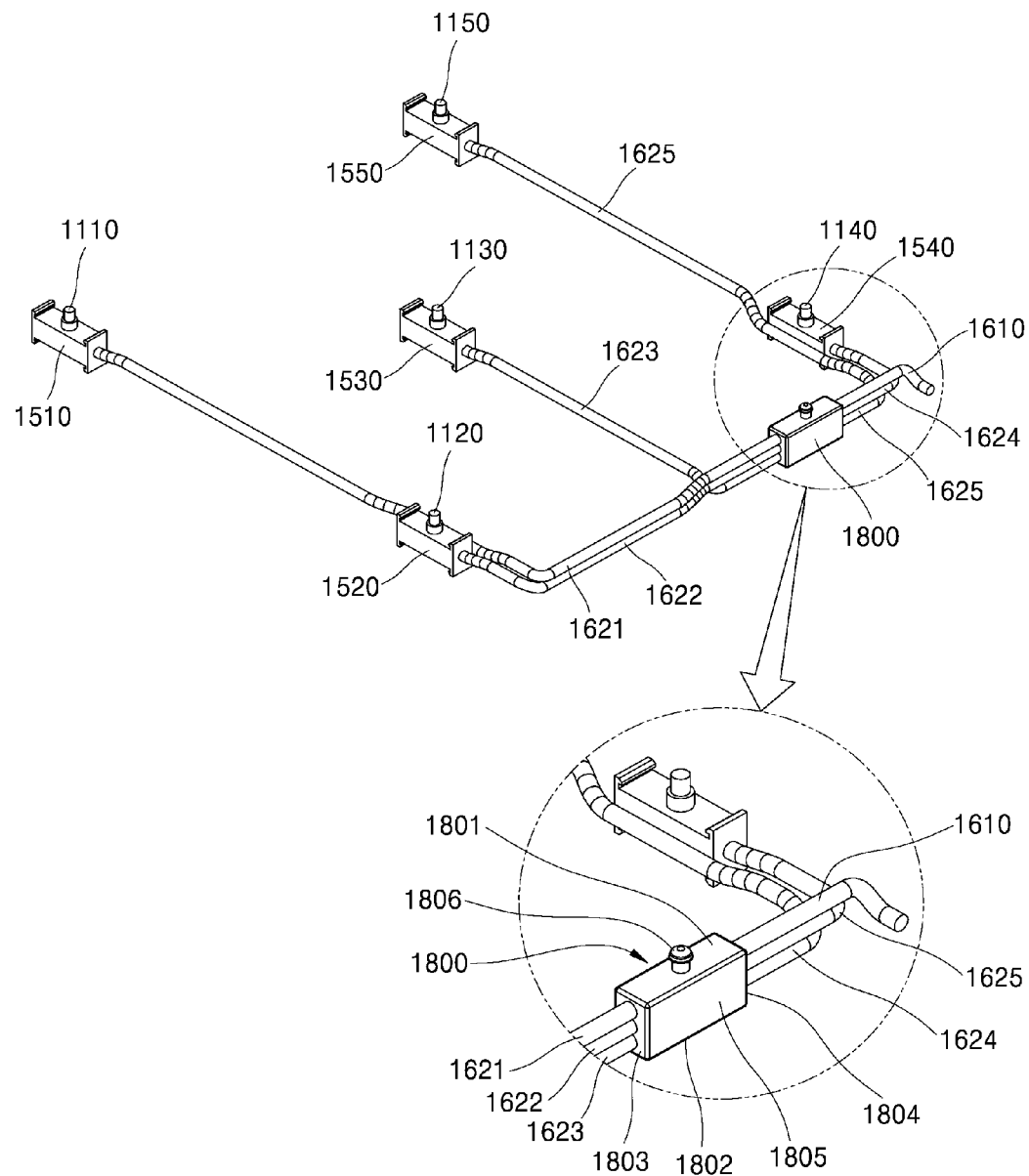
FIGS. 13 and 14 show an example cable holder.

Referring to FIG. 13, five discharge tips 1100 and five tip holders 1500 are disposed in an electrification space divided into total nine electrification spaces. The present disclosure is not limited thereto, but is described with respect to an embodiment in which the five discharge tips 1100 and the five tip holders 1500 are provided as shown.

The five discharge tips 1100 are sequentially referred to as a first discharge tip 1110, a second discharge tip 1120, a third discharge tip 1130, a fourth discharge tip 1140, and a fifth discharge tip 1150 as shown to distinguish the five discharge tips 1100. Five tip holders 1500 are sequentially referred to as a first tip holder 1510, a second tip holder 1520, a third tip holder 1530, a fourth tip holder 1540, and a fifth tip holder 1550 as shown to distinguish the five holders 1500.

As shown, the first discharge tip 1110, the second discharge tip 1120, the third discharge tip 1130, the fourth discharge tip 1140, and the fifth discharge tip 1150 are supported on the first tip holder 1510, the second tip holder 1520, the third tip holder 1530, the fourth tip holder 1540, and the fifth tip holder 1550, are spaced apart from one another, and are disposed on the same plane.

In this case, distances between the third discharge tip 1130 disposed at the center thereof and the other discharge tips 1110, 1120, 1140, and 1150 may be set equally. Thereby, ions may be evenly discharged into the air from the discharge tips 1110, 1120, 1130, 1140, and 1150, and electrification efficiency for dust particles may be maximized.

As shown, a first cable 1621, a second cable 1622, a third cable 1623, a fourth cable 1624, and a fifth cable 1625 to supply voltage are connected to the first discharge tip 1110, the second discharge tip 1120, the third discharge tip 1130, the fourth discharge tip 1140, and the fifth discharge tip 1150, and contact points between the discharge tips 1110, 1120, 1130, 1140, and 1150 and the cables 1621, 1622, 1623, 1624, and 1625 are protected in the tip holders 1510, 1520, 1530, 1540, and 1550.

In this case, the first cable 1621, the second cable 1622, the third cable 1623, the fourth cable 1624, and the fifth cable 1625 may be electrically connected to the high voltage supplier 2200. When the first cable 1621, the second cable 1622, the third cable 1623, the fourth cable 1624, and the fifth cable 1625 may be electrically connected to the high voltage supplier 2200, a space to support and store individual cables 1621, 1622, 1623, 1624, and 1625 may be additionally provided, and connection terminals may be individually disposed in the high voltage supplier 2200. In this case, a number of cables or a length of cables is increased and a size of a frame 1400 to support and protect the cables 1621, 1622, 1623, 1624, and 1625 may be increased.

As a means for solving such a problem, an electrification apparatus for electric dust collection 100 according to the present disclosure includes a cable holder 1800 to simplify the connection structure of the high voltage cables 1621, 1622, 1623, 1624, and 1625.

As shown in an enlarged view of FIG. 13, the cable holder 1800 may have a rectangular parallelepiped shape and a lateral width that is larger than each of a vertical height and a thickness in a forward and rearward direction.

A cable connection structure is disposed at an inside of the cable holder 1800 having the rectangular parallelepiped shape to branch a main cable 1610 having a first end electrically connected to the high voltage supplier 2200 into the first cable 1621, the second cable 1622, the third cable 1623, the fourth cable 1624, and the fifth cable 1625.

That is, the cable holder 1800 protects and maintains the branch portion or a contact point between the main cable 1610 and the plurality of cables 1621, 1622, 1623, 1624, and 1625.

For example, the first end of the main cable 1610 may be electrically connected to the high voltage supplier 2200 and a second end of the main cable 1610 may extend to an inside of the cable holder 1800 through a left surface 1804 of the cable holder 1800. As shown, the second end of the main cable 1610 may extend through an upper portion of the left surface 1804 of the cable holder 1800. That is, only a single main cable 1610 is electrically connected to the high voltage supplier 2200, thereby simplifying a configuration of a connection portion electrically connected to the high voltage supplier 2200.

The second end of the main cable 1610 may extend to an inside of the cable holder 1800 and may be branched into the first cable 1621, the second cable 1622, the third cable 1623, the fourth cable 1624, and the fifth cable 1625.

The first cable 1621, the second cable 1622, and the third cable 1623 protrude outward from the cable holder 180 through a right surface 1803 of the cable holder 1800 and may extend toward the first discharge tip 1110, the second discharge tip 1120, and the third discharge tip 1130, respectively. That is, the first cable 1621, the second cable 1622, and the third able 1623 extend through the right surface 1803 of the cable holder 1800 to supply the voltage to the first discharge tip 1110, the second discharge tip 1120, and the third discharge tip 1130 disposed at a right side of the cable holder 1800 in a lateral direction (i.e., a Le-Ri direction).

The fourth cable 1624 and the fifth cable 1625 may extend through the left surface 1804 of the cable holder 1800 to supply a voltage to the fourth discharge tip 1140 and the fifth discharge tip 1150 disposed at a left side of the cable holder 1800.

In this case, the first cable 1621, the second cable 1622, and the third cable 1623 may protrude from the right surface 1803 of the cable holder 1800 and are disposed in the vertical direction (i.e., a U-D direction) in parallel to one another, and the main cable 1610, the fourth cable 1624, and the fifth cable 1625 may protrude from the left surface 1804 of the cable holder 1800 and may be disposed in the vertical direction (i.e., the U-D direction) in parallel to one another, to minimize a thickness of the cable holder 1800 in a forward and rearward direction thereof.

That is, the same number of cables is disposed at the left surface 1804 and the right surface 1804 of the cable holder 1800, thereby minimizing and optimizing the height of the cable holder 1800 in the forward and rearward direction and minimizing a vertical height of an electrification module 1000.

When the third discharge tip 1130, the fourth discharge tip 1140, and the fifth discharge tip 1150 are disposed at the left side of the cable holder 1800 in the lateral direction (i.e., the Le-Ri direction), the third cable 1623, the fourth cable 1624, and the fifth cable 1625 may be connected to the third discharge tip 1130, the fourth discharge tip 1140, and the fifth discharge tip 1150 through the left surface 1804 of the cable holder 1800, and the main cable 1610, the first cable 1621, and the second cable 1622 may be connected to the first discharge tip 1110 and the second discharge tip 1120 through the right surface 1803 of the cable holder 1800.

The cable holder 1800 may be manufactured by the insert injection in a state in which the main cable 1610 is branched into the first cable 1621, the second cable 1622, the third cable 1623, the fourth cable 1624, and the fifth cable 1625.

The configuration already well-known in the art may be applied to the branch structure of the main cable 1610 into the first cable 1621, the second cable 1622, the third cable 1623, the fourth cable 1624, and the fifth cable 1625 and the insert injection method, and a description of detailed configurations thereof is omitted.

The cable holder 1800 may be accommodated between an upper outer frame 1411 and a lower outer frame 1421 in a state in which an upper surface 1801 of the cable holder 1800 may surface-contact the upper outer frame 1411 and a lower surface 1802 of the cable holder 1800 may surface-contact the lower outer frame 1421. In this case, the cable holder 1800 may be accommodated at a front end 1411d of the upper outer frame 1411 and a front end of the lower outer frame 1421, which are adjacent to a cover module 2000 including a high voltage supplier 2200, to minimize a length of the main cable 1610.

A fixing protrusion 1806 may protrude from the upper surface 1801 of the cable holder 1800 in an upward direction (i.e., a U direction) to fix the cable holder 1800. The front end 1411*d* of the upper outer frame 1411 may include an insertion hole through which the fixing protrusion 1806 passes.

FIG. 13 shows a single cable holder 1800. As shown in FIG. 14, a cable holder 1800 may include a plurality of cable holders 1810 and 1820.

Figure 14:
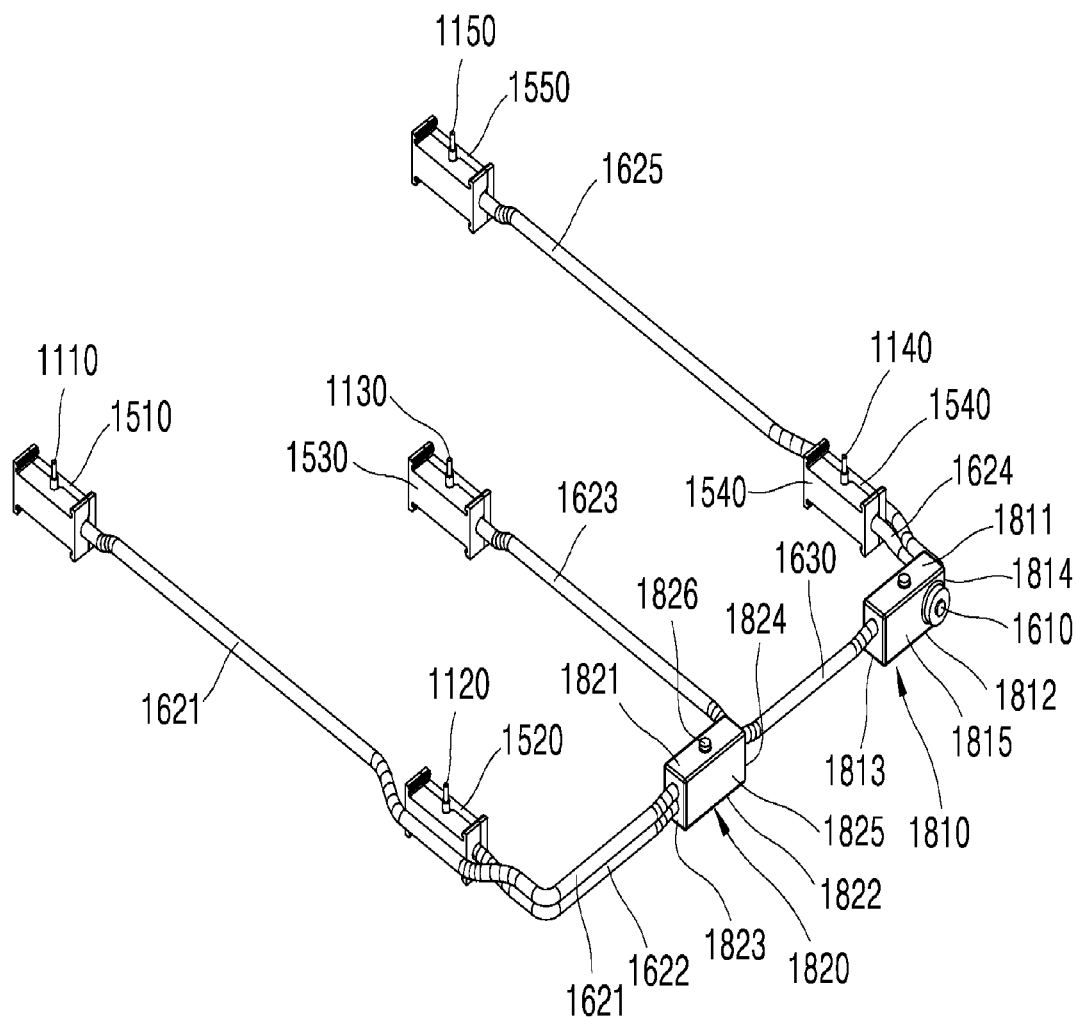

Referring to FIG. 14, the cable holder may include the first cable holder 1810 and the second cable holder 1820 that are spaced from each other in a lateral direction (i.e., an Le-Ri direction), and a third discharge tip 1130 is disposed between the first cable holder 1810 and the second cable holder 1820.

Similar to the cable holder 1800 shown in FIG. 13, the first cable holder 1810 and the second cable holder 1820 each have a cable connection structure to branch a plurality of cables.

In addition, similar to the cable holder 1800 shown in FIG. 13, the first cable holder 1810 and the second cable holder 1820 connect the cables through respective side surfaces thereof.

A number of cables connected through the side surfaces of each of the first cable holder 1810 and the second cable holder 1820 is less than a number of cables connected to the cable holder 1800 shown in FIG. 13.

A main cable 1610 is connected to one surface, preferably, a front surface of the first cable holder 1810.

The main cable 1610 branches from the inside of the first cable holder 1810, and a fourth cable 1624 and a fifth cable 1625 protrude from the left surface 1824 of the cable holder 1820 in the vertical direction (i.e., a U-D direction) and are arranged side by side, and a middle cable 1630 protrudes from the right surface 1813 of the first cable holder 1810 and extends.

The middle cable 1630 may protrude from the right surface 1813 of the first cable holder 1810 and may extend to the inside of the second cable holder 1820 through the left surface 1824 of the second cable holder 1820.

The middle cable 1630 extends into the second cable holder 1820 and is branched into the first cable 1621, the second cable 1622, and the third cable 1623.

As shown, among the branched cables, the first cable 1621 and the second cable 1622 may protrude from the right surface 1823 of the second cable holder 1820 and may be disposed side by side in the vertical direction (i.e., the U-D direction), and the third cable 1622 may protrude from the left surface 1824 of the second cable 1820 and may be disposed side by side with the middle cable 1630 in the vertical direction (i.e., the U-D direction).

That is, a number of cables connected to each of both surfaces of each of the first cable holder 1810 and the second cable holder 1820 may be limited to two or less cables. In this case, a height of each of the first cable holder 1810 and the second cable holder 1820 may be additionally lowered, and a vertical height of an electrification module 1000 may be additionally lowered.

Similar to the example shown in FIG. 13, fixing protrusions 1816 and 1826 to fix them may be defined on an upper surface 1811 of the first cable holder 1810 and an upper surface 1821 of the second cable holder 1820 and may protrude in an upward direction (i.e., the U direction). The front end 1411*d* of the upper outer frame 1411 may include a plurality of insertion holes through which a fixing protrusion 1806 passes.

Hereinafter, a process in which a tip holder 1500 and a high voltage cable 1600 are assembled to a frame 1400 is described with reference to FIGS. 15 to 17.

Figure 15:
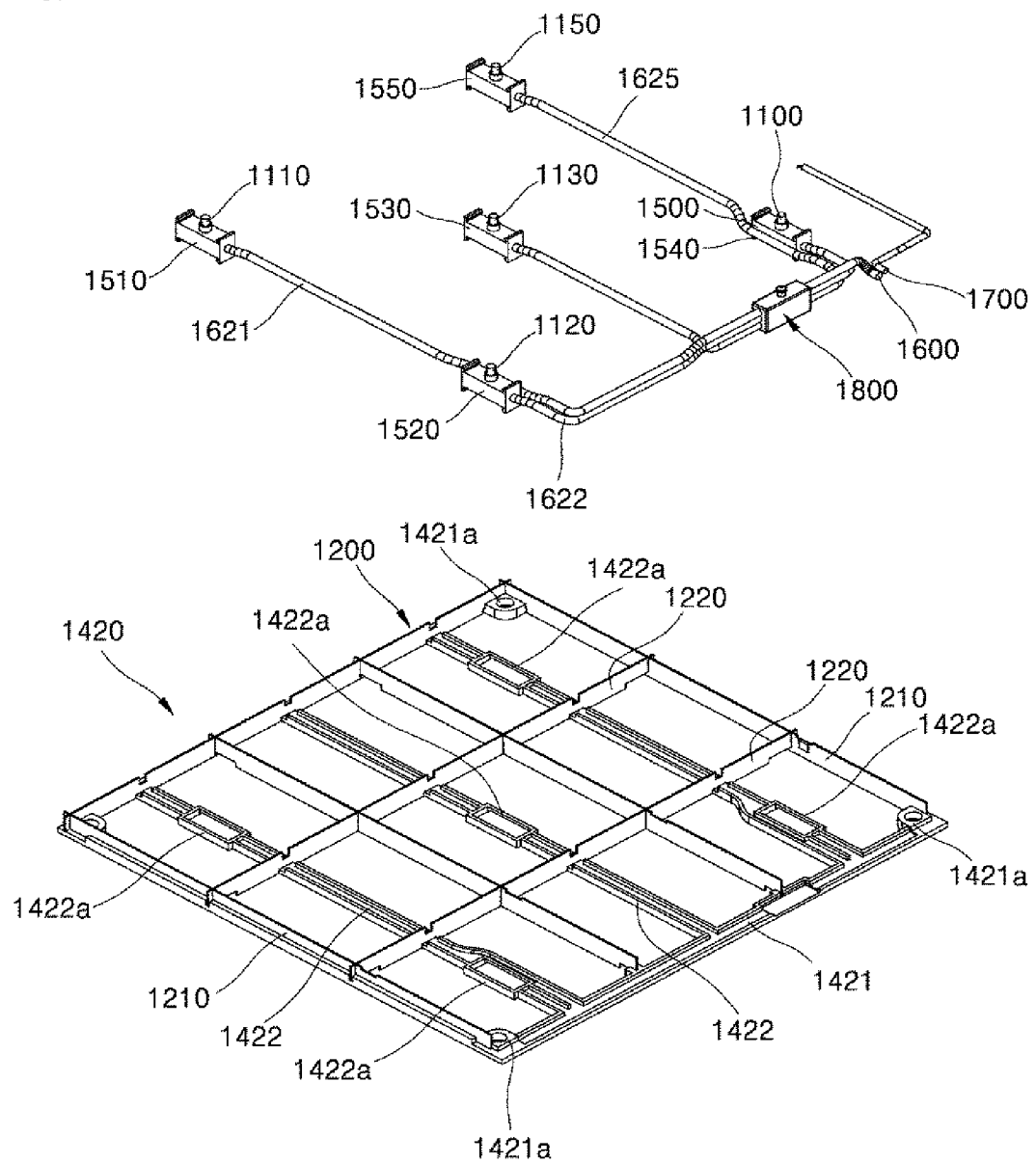
FIGS. 15 to 17 are perspective views showing an example assembly process of an electrification module.

After the high voltage cable 1600 is aligned using the cable holder 1800 through the above process, as shown in FIG. 15, individual tip holders 1510, 1520, 1530, 1540, and 1520, a cable holder 1800, a main cable 1610, and individual cables 1621, 1622, 1623, 1624, and 1625 are aligned according to their respective positions.

After the alignment is completed, in a state in which a conductive plate 1200 is disposed on a lower frame 1420, a lower hook 1531, 1532 is coupled to the lower frame 1420 by inserting the lower hook 1531, 1532 of the individual tip holder 1500 into a second coupling hole 1422*b* of the second coupling portion 1422*a* disposed at the lower frame 1420.

Figure 16:
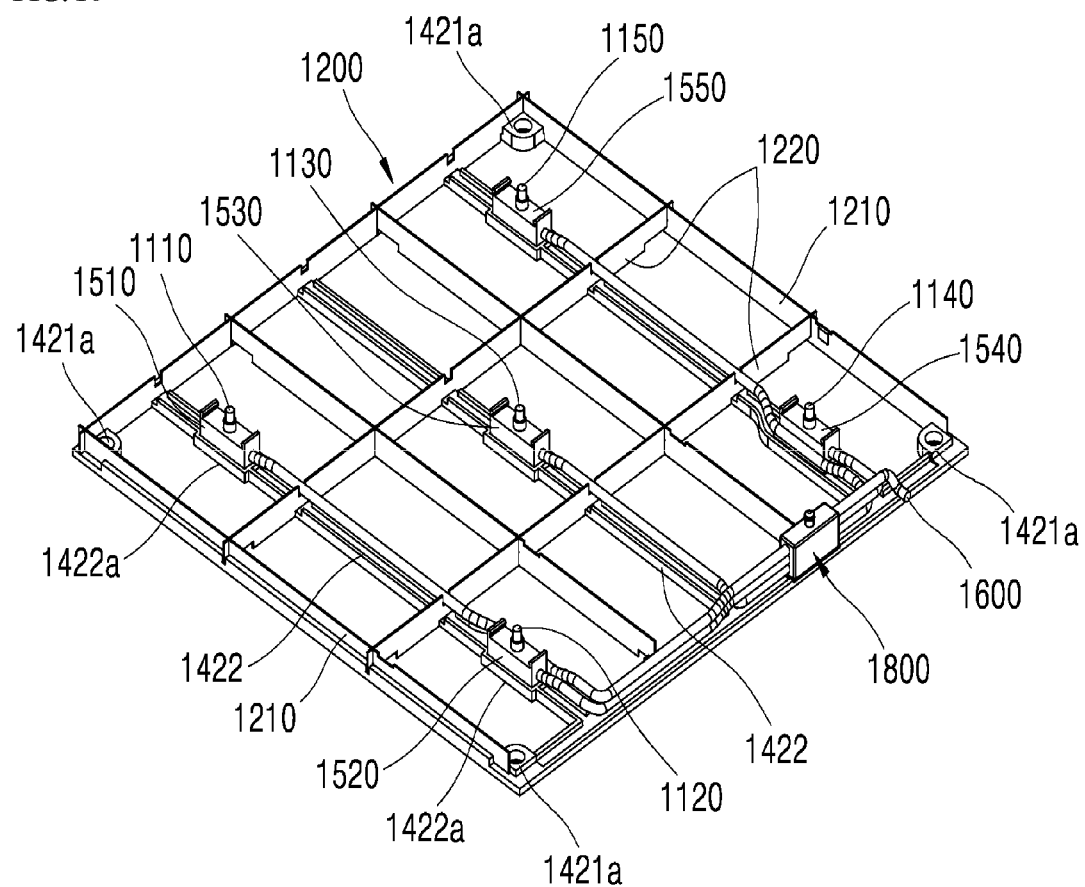

After the lower hook 1531, 1532 is coupled as shown in FIG. 16, the positions of the cable holder 1800, the main cable 1610, and the individual cables 1621, 1622, 1623, 1624, and 1625 are aligned.

Figure 17:
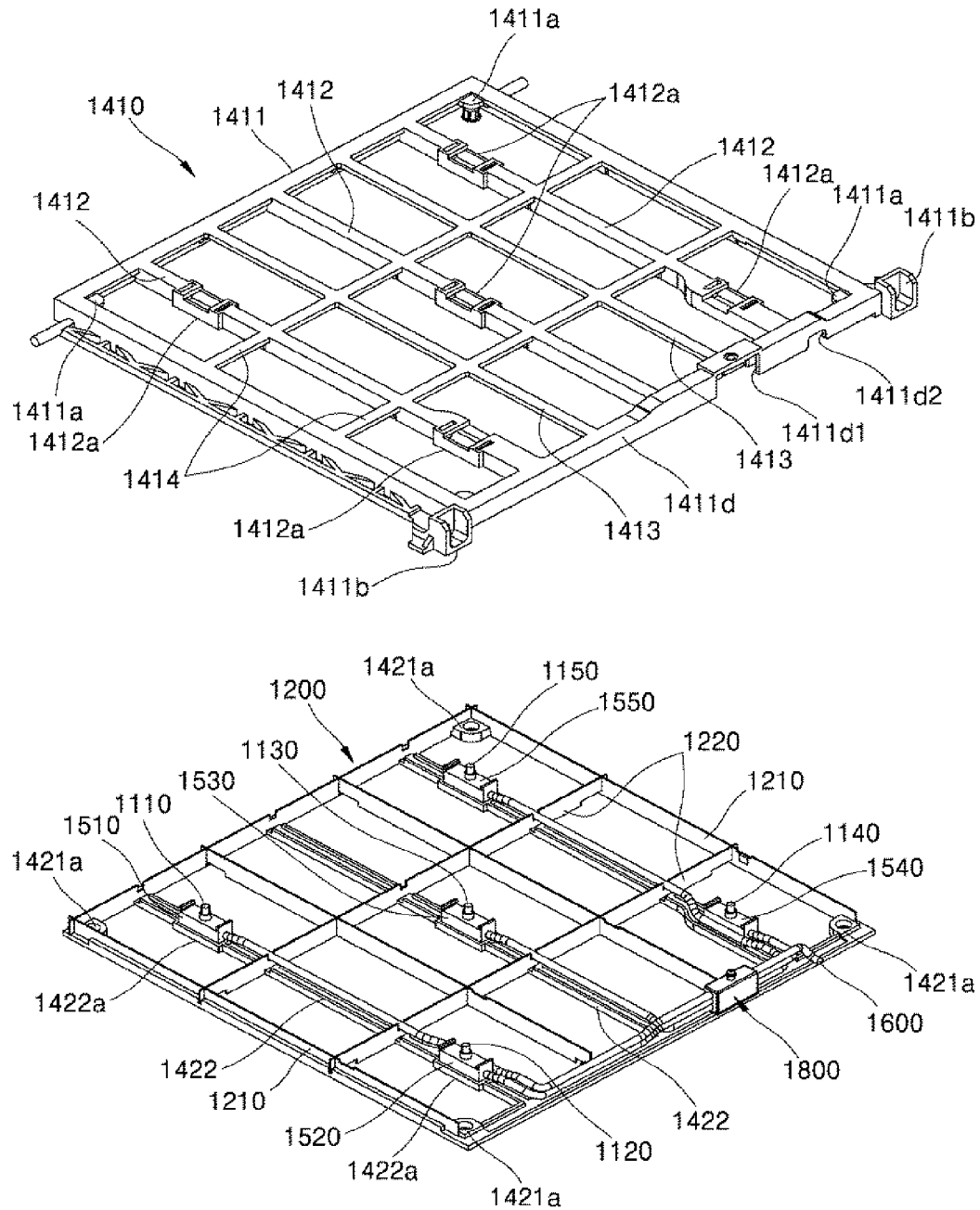

Subsequently, as shown in FIG. 17, an upper frame 1410 is moved upward the lower frame 1420.

After the upper frame 1410 is moved and the position thereof is set, the upper frame 1410 is moved downward toward the lower frame 1420 and is coupled to the lower frame 1420.

In this case, as the fastening hook 1421*a* of the lower frame 1420 is inserted into a fastening hole 1411*a* of the upper frame 1410, a lower outer frame 1421 of the lower frame 1420 is coupled to an upper outer frame 1411 of the upper frame 1410.

In addition, as the upper hook 1521, 1522 of the individual tip holders 1510, 1520, 1530, 1540, and 1550 is inserted into the first coupling hole 1412*b* of the upper frame 1410, a lower inner frame 1422 of the lower frame 1420 is coupled to a first upper inner frame 1412 of the upper frame 1410.

That is, as an inner side of the upper frame 1410 and an inner side of the lower frame 1420 are coupled to each other using the individual tip holders 1510, 1520, 1530, 1540, and 1550, an additional means for coupling the lower frame 1420 to the upper frame 1410 is not needed. Therefore, the strength of the lower frame 1420 and the upper frame 1410 may be reinforced, a number of components may be reduced, and manufacturing cost thereof may be reduced.

After the lower frame 1420 and the upper frame 1410 are coupled to each other, a filter cover module 2000 is attached to a connector 1411*b* disposed at a rear end of the upper frame 1410 to complete the assembly of an electrification apparatus for electric dust collection 1000 according to the present disclosure.

The present disclosure has been described with reference to drawings hereinabove; however, the present disclosure is not limited to the embodiments and the exemplary drawings herein, and various modifications can be made by the skilled person in the art within the scope of the technical idea of the present disclosure. Further, even if working effects obtained based on the configurations of the present disclosure are not explicitly described in the description of embodiments of the present disclosure, effects predictable based on the corresponding configuration have to be recognized.

[Description of Reference Numerals]

100: Electrification apparatus for electric dust collection
1000: Electrification module -continued

[Description of Reference Numerals]

| | |
|---|---|
| 1100: Discharge tip | 1200: Conductive plate |
| 1400: Frame | 1500: Tip holder |
| 1600: High voltage cable | |
| 1800: Cable holder | |
| 2000: Cover module | 2100: Cover |
| 2200: High voltage supplier | |

What is claimed is:

1. An electrification apparatus for dust collection, comprising:
an electrification module configured to generate an ion that is emitted to air, wherein the electrification module comprises:
at least one discharge tip configured to emit the ion in a direction opposite to a flow direction of the air;
at least one tip holder supporting the discharge tip;
a conductive plate configured to generate a potential difference with the discharge tip; and
a frame that defines an appearance of the electrification module and that supports the tip holder and the conductive plate,
wherein the frame comprises an upper frame disposed at an upper side of the conductive plate and a lower frame disposed at a lower side of the conductive plate,
wherein the tip holder is disposed between the upper frame and the lower frame,
wherein an upper surface of the tip holder is coupled to the upper frame and a lower surface of the tip holder is coupled to the lower frame, and
wherein the upper surface of the tip holder is detachably coupled to the upper frame, and the lower surface of the tip holder is detachably coupled to the lower frame.

2. The electrification apparatus of claim 1, wherein the tip holder comprises:
a hexahedral main body having an upper surface coupled to the upper frame and a lower surface coupled to the lower frame;
a pair of upper hooks that protrudes upward from the upper surface of the hexahedral main body and that is coupled to the upper frame; and
a pair of lower hooks that protrudes downward from the lower surface of the hexahedral main body and that is coupled to the lower frame.

3. The electrification apparatus of claim 2,
wherein the pair of upper hooks comprises:
a front upper hook disposed at a front end of the upper surface of the hexahedral main body; and
a rear upper hook disposed at a rear end of the upper surface of the hexahedral main body, and
wherein the discharge tip is disposed between the front upper hook and the rear upper hook and protrudes upward from the upper surface of the hexahedral main body.

4. The electrification apparatus of claim 3, wherein a height of the discharge tip from the upper surface of the hexahedral main body is taller than a height of each of the front upper hook and the rear upper hook from the upper surface of the hexahedral main body.

5. The electrification apparatus of claim 3, wherein the front upper hook and the rear upper hook are configured to be angled, based on the front upper hook and the rear upper hook being coupled to the upper frame, in a direction away from each other.

6. The electrification apparatus of claim 3, wherein the pair of lower hooks comprises:
a front lower hook disposed at a front end of the lower surface of the hexahedral main body; and
a rear lower hook disposed at a rear end of the lower surface of the hexahedral main body.

7. The electrification apparatus of claim 6, wherein the front lower hook and the rear lower hook are configured to be angled, based on the front lower hook and the rear lower hook being coupled to the lower frame, in a direction away from each other.

8. The electrification apparatus of claim 6,
wherein the upper frame comprises a pair of first coupling holes through which the front upper hook and the rear upper hook pass and defines an opening that is disposed between the pair of first coupling holes and through which (i) the discharge tip passes and (ii) a part of the upper surface of the hexahedral main body is exposed to outside of the frame.

9. The electrification apparatus of claim 8, wherein the lower frame comprises a pair of second coupling holes through which the front lower hook and the rear lower hook pass.

10. The electrification apparatus of claim 2, wherein the electrification module further comprises a high voltage cable that extends inward through the hexahedral main body and that is electrically connected to the discharge tip inside the hexahedral main body.

11. The electrification apparatus of claim 10,
wherein the electrification module further comprises a tube that surrounds a contact point at which the discharge tip and the high voltage cable are electrically connected, and
wherein a part of the tube protrudes from the upper surface of the tip holder.

12. The electrification apparatus of claim 11, wherein the tube is a heat shrinkable tube.

13. The electrification apparatus of claim 10,
wherein the hexahedral main body comprises a first body and a second body that are manufactured separately, and
wherein portions of the discharge tip and the high voltage cable are (i) disposed between the first body and the second body and (ii) pressed by the first body and the second body.

14. The electrification apparatus of claim 13, wherein a first surface of the first body facing the second body defines a seating groove that has a shape corresponding to an outer shape of the discharge tip and the high voltage cable.

15. The electrification apparatus of claim 10, wherein the discharge tip and the high voltage cable are coupled to the hexahedral main body by insert injection molding.

16. The electrification apparatus of claim 10,
wherein the electrification module further comprises a high voltage supplier configured to generate a voltage to supply the voltage to the discharge tip, and
wherein the high voltage cable comprises a main cable having a first end electrically connected to the high voltage supplier.

17. The electrification apparatus of claim 16,
wherein the at least one discharge tip comprises a first discharge tip and a second discharge tip that are spaced apart from each other,
wherein the high voltage cable further comprises a first cable electrically connected to the first discharge tip and a second cable electrically connected to the second discharge tip, and wherein each of the first cable and the second cable is branched from a second end of the main cable.

18. The electrification apparatus of claim 17, wherein the electrification module further comprises a cable holder configured to accommodate a branch portion at which the main cable is branched into the first cable and the second cable.

19. The electrification apparatus of claim 18, further comprising a cover module disposed at a front side of the electrification module, wherein the cover module comprises the high voltage supplier.

* * * * *